US009208396B2

(12) United States Patent
Nishiyama

(10) Patent No.: US 9,208,396 B2
(45) Date of Patent: Dec. 8, 2015

(54) IMAGE PROCESSING METHOD AND DEVICE, AND PROGRAM

(71) Applicant: CANON KABUSHIKI KAISHA, Tokyo (JP)

(72) Inventor: Tomohiro Nishiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 13/754,094

(22) Filed: Jan. 30, 2013

(65) Prior Publication Data
US 2013/0223759 A1 Aug. 29, 2013

(30) Foreign Application Priority Data

Feb. 28, 2012 (JP) ................................ 2012-041147
Nov. 6, 2012 (JP) ................................ 2012-244399

(51) Int. Cl.
G06K 9/36 (2006.01)
G06T 5/50 (2006.01)
H04N 5/232 (2006.01)
H04N 13/02 (2006.01)

(52) U.S. Cl.
CPC ... *G06K 9/36* (2013.01); *G06T 5/50* (2013.01); *H04N 5/23232* (2013.01); *G06T 2207/10052* (2013.01); *G06T 2207/10148* (2013.01); *G06T 2207/20221* (2013.01); *H04N 13/0242* (2013.01)

(58) Field of Classification Search
USPC ....................................................... 382/284
See application file for complete search history.

(56) References Cited

U.S. PATENT DOCUMENTS

| 8,358,367 | B2 * | 1/2013 | Ng et al. ........................ 348/349 |
| 8,619,177 | B2 * | 12/2013 | Perwass et al. ............... 348/340 |
| 8,660,312 | B2 * | 2/2014 | Cui et al. ....................... 382/106 |
| 8,866,920 | B2 * | 10/2014 | Venkataraman et al. .. 348/218.1 |
| 2012/0155784 | A1 | 6/2012 | Nishiyama |
| 2012/0314104 | A1 | 12/2012 | Nishiyama |
| 2013/0058591 | A1 | 3/2013 | Nishiyama et al. |

FOREIGN PATENT DOCUMENTS

JP 2011-55246 A 3/2011
WO 2008050904 A1 5/2008

OTHER PUBLICATIONS

R. NG et al., "Light Field Photography with a Hand-held Plenoptic Camera", Stanford Tech Report CTSR Feb. 2005, 2005.

* cited by examiner

Primary Examiner — Yon Couso
(74) Attorney, Agent, or Firm — Fitzpatrick, Cella, Harper & Scinto

(57) ABSTRACT

In image processing of multi-viewpoint image data including image data captured with different focal lengths, an image of high quality, distance information with high precision, etc., are obtained by utilizing image data with different angles of view (focal lengths). An image processing device for generating combined image data using multi-viewpoint image data including image data acquired with different focal lengths, includes a resolution converting unit configured to perform resolution conversion for at least part of image data in multi-viewpoint image data in accordance with a focal length to be output and an image combining unit configured to generate combined image data with the focal length to be output using the resolution-converted image data.

8 Claims, 30 Drawing Sheets

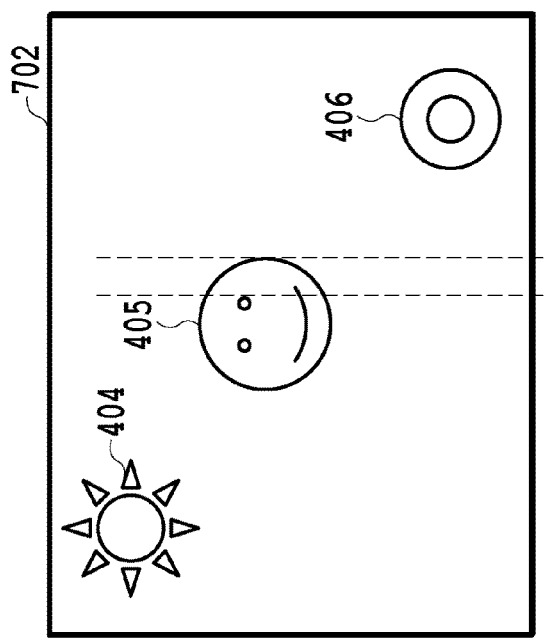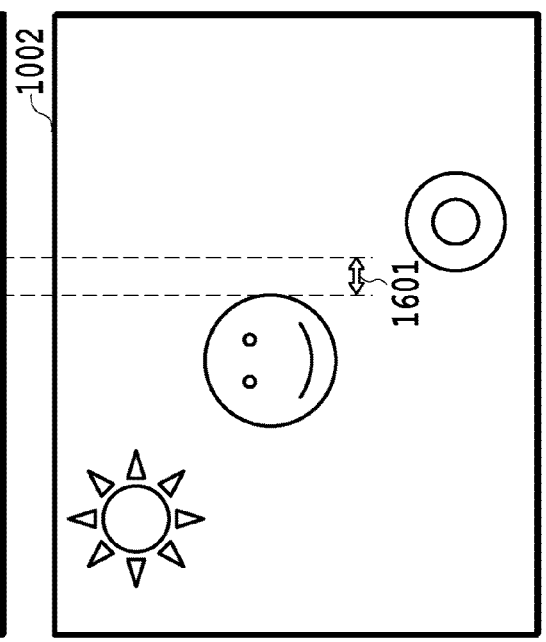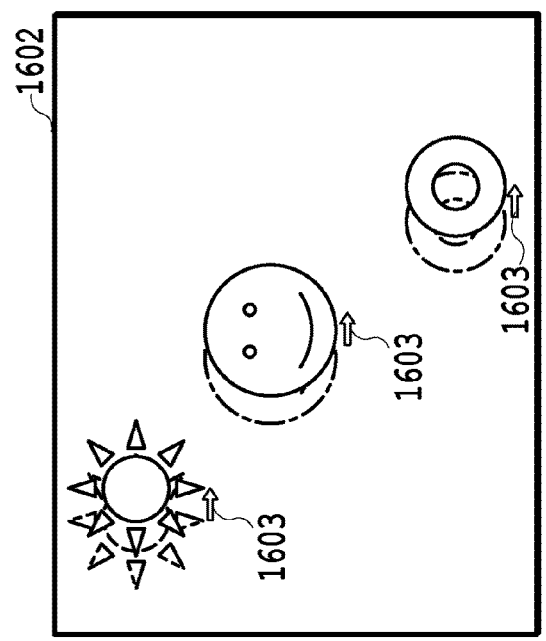
FIG.16

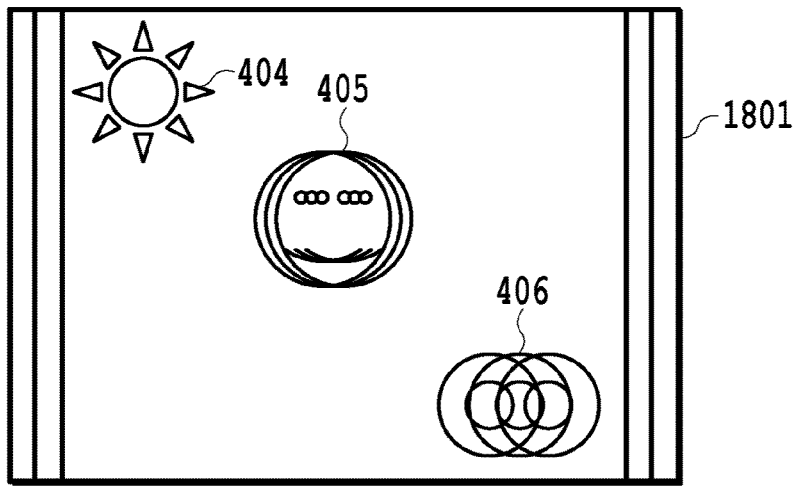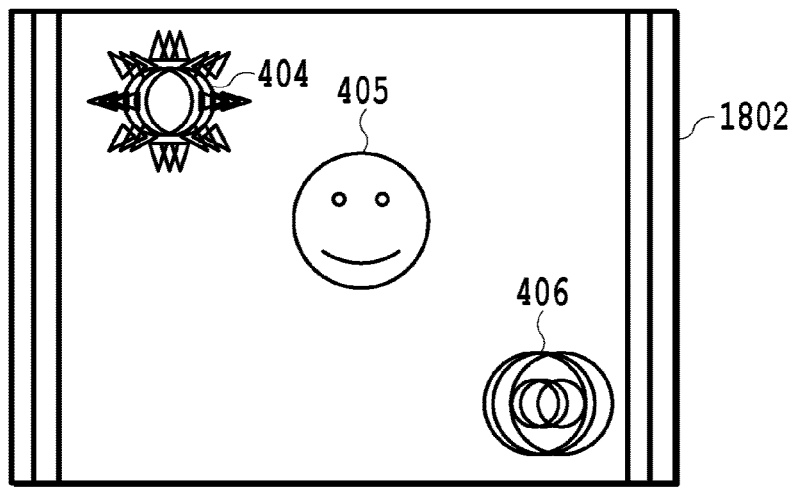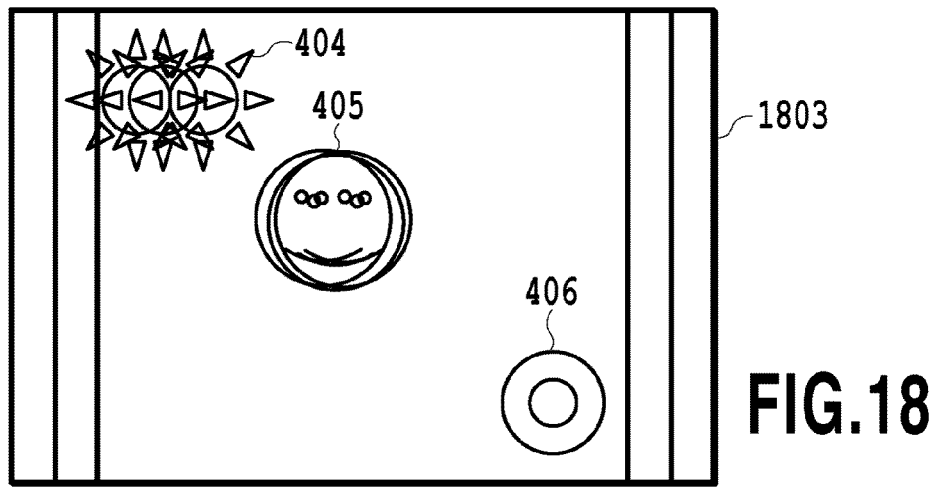
FIG.18

IMAGE PROCESSING METHOD AND DEVICE, AND PROGRAM

BACKGROUND OF THE INVENTION

1. Field of the Invention

The present invention relates to combination processing of an image using multi-viewpoint image data.

2. Description of the Related Art

Conventionally, when an image was captured by a camera out of focus, it was necessary to recapture the image after performing focusing again. Further, when it was desired to obtain focused images of a plurality of subjects with different depths, it was necessary to capture the image of each subject in focus a plurality of times.

In recent years, a technique called light field photography has been developed, which is capable of adjusting the focus position in the later image processing (refocus) by adding a new optical element to the optical system to acquire images from multiple viewpoints.

By using this technique, there is an advantage that a failure in focusing at the time of image capturing can be made up by image processing because it is possible to perform focusing after image capturing. Further, there is also an advantage that it is possible to obtain a plurality of images focused on an arbitrary subject in an image from one captured image by changing the image processing method, and therefore, it is possible to reduce the number of times of image capturing.

In light field photography, the direction and intensity of a light beam that passes through each position (light field, hereinafter, referred to as "LF") in a plurality of positions in a space are calculated from multi-viewpoint image data. Then, by using the information of the obtained LF, an image on the assumption that light passes through a virtual optical system and forms the image on a virtual sensor is calculated. By appropriately setting such a virtual optical system and a virtual sensor, refocus is also enabled. The mathematical nature and mathematical fundamentals relating to LF are discussed by R. NG et al. (R. NG, M. Levoy, M. Bredif, G. Duval, M. Horowitz, P. Hanrahan, "Light Field Photography with a Hand-held Plenoptic Camera" (Stanford Tech Report CTSR 2005-02, 2005). Hereinafter, processing to calculate image data that a virtual sensor obtains from multi-viewpoint image data is referred to as combination processing.

As an image capturing technique for acquiring LF, a camera array in which single cameras are arranged side by side and a Plenoptic camera in which a microlens array is arranged behind a main lens are known. Here, "single camera" represents one of the camera array which consists of a plurality of cameras. It is possible for the camera array and the Plenoptic camera to combine image data on the virtual sensor after image capturing from the acquired LF.

As a method for combining images on the virtual sensor from LF, there is known a method in which acquired image data of a plurality of images is projection-transformed onto a virtual sensor, and added and averaged (WO2008/050904).

Further, there is known a technique to put a telephoto image into a wide-angle image with the magnification adjusted to that at the time of zoom by capturing images using a camera array with different focal lengths in which a plurality of single cameras with different focal lengths exists mixedly to perform optical-equivalent zoom without mounting a zoom mechanism (Japanese Patent Laid-Open No. 2011-55246).

For example, a case is considered where the technique of WO2008/050904 is applied when performing refocus on multi-viewpoint image data captured by the camera array with different focal lengths shown in Japanese Patent Laid-Open No. 2011-55246. In this case, the image data captured by a single camera with a different angle of view is not utilized, and therefore, the combined image that is completed is of relatively low image quality. Similarly, also in the case where a distance to a subject is estimated using multi-viewpoint image data captured by a camera array with different angle of view (or "focal lengths"), relatively low precision will result unless the image data captured by a single camera with a different angle of view is utilized.

SUMMARY OF THE INVENTION

An image processing device according to the present invention is an image processing device for generating combined image data using multi-viewpoint image data including image data acquired with different focal lengths, the image processing device including: a resolution converting unit configured to perform resolution conversion for at least part of image data in multi-viewpoint image data in accordance with a focal length to be output; and an image combining unit configured to generate combined image data with the focal length to be output using the resolution-converted image data.

According to the present invention, in the image processing of multi-viewpoint image data including image data captured with different focal lengths, it is made possible to obtain an image of high quality, distance information with high precision, etc., by utilizing image data with different angles of view (focal lengths).

Further features of the present invention will become apparent from the following description of exemplary embodiments (with reference to the attached drawings).

BRIEF DESCRIPTION OF THE DRAWINGS

FIG. 16 is a diagram for explaining the way a shifted image is generated;

FIG. 18 is a diagram showing an example of combined images generated by image combination processing according to the first embodiment;

DESCRIPTION OF THE EMBODIMENTS

[First Embodiment]

Figure 1:
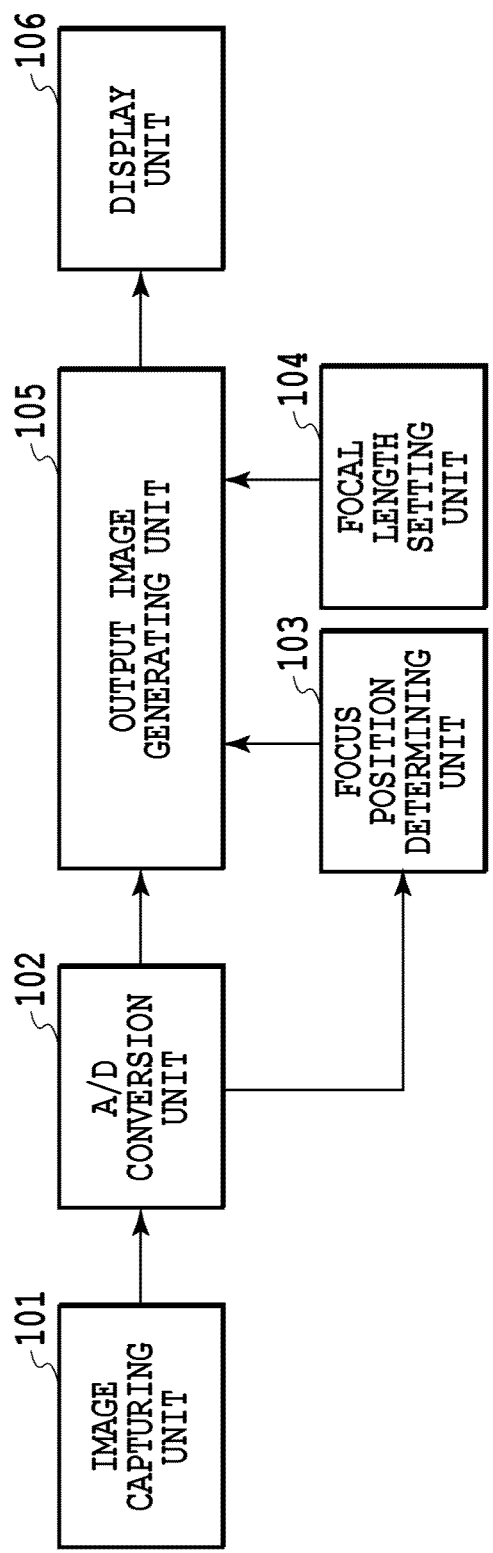
FIG. 1 is a diagram showing essential components of an image capturing device according to a first embodiment.

FIG. 1 is a diagram showing essential components of an image capturing device according to a first embodiment.

An image capturing unit 101 includes a zoom lens, focus lens, camera-shake correction lens, stop, shutter, optical low-pass filter, IR cut filter, color filter, and image sensing elements (sensor), such as CMOS and CCD, and is configured to detect an amount of light of a subject. Note that, the image capturing unit 101 in the present embodiment is a camera array with different focal lengths which is capable of simultaneously capturing a plurality of images from different viewpoints and in which a plurality of single cameras having two or more kinds of focal lengths exists mixedly.

An A/D conversion unit 102 converts an amount of light of a subject detected by the image capturing unit 101 into a digital value and sends a digital signal (digital image data) to an output image generating unit 105.

A focus position determining unit 103 determines a focus position (focus plane) based on an instruction etc. from a user.

A focal length setting unit 104 sets a focal length (output focal length) of combined image data to be output based on an instruction from a user.

The output image generating unit 105 generates combined image data by performing combination processing etc. on the received digital image data based on focus position information and an output focal length. The generated combined image data is output to a display unit 106. Note that, the output image generating unit 105 may be configured as an independent image processing device.

The display unit 106 displays combined image data.

Note that, although not shown schematically in FIG. 1, the image capturing device includes a CPU configured to totally control each of the units described above, a ROM configured to store control programs etc. executed by the CPU, and a RAM configured to function as a work area etc. of the CPU. Further, the image capturing device also includes an image capturing system control unit configured to control an image capturing system based on an instruction from the CPU and an operation unit (user interface) with which a user gives various instructions.

Figure 2:
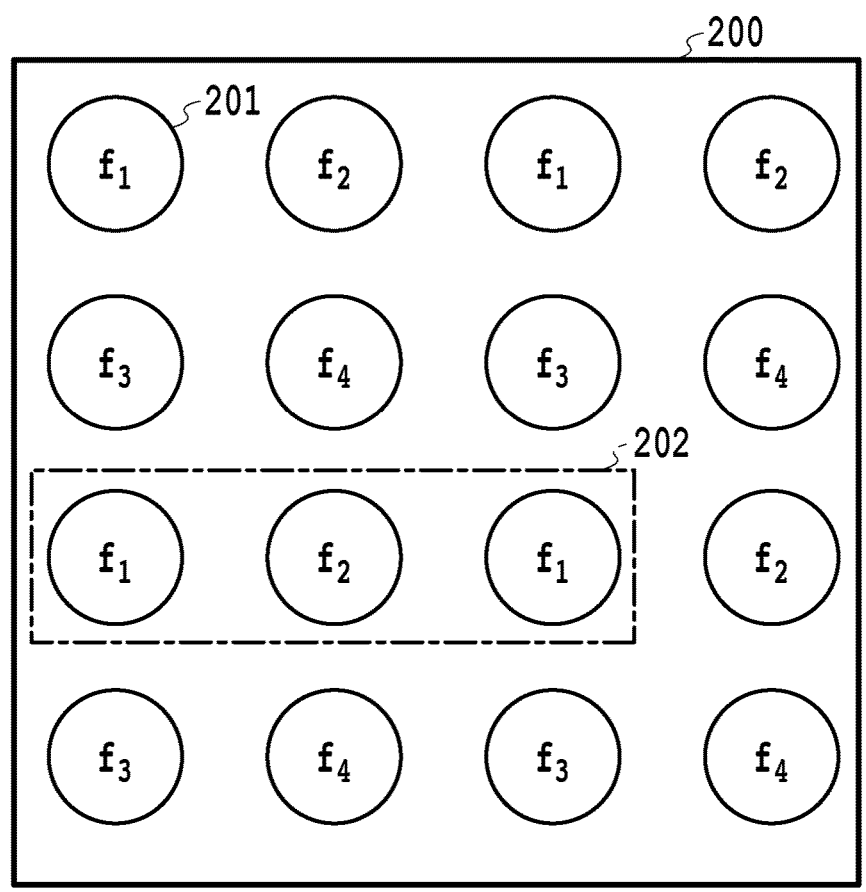
FIG. 2 is a diagram when a camera array with different focal lengths, which is a specific example of an image capturing unit, is viewed from above an optical axis.

Here, the image capturing unit 101 is explained. FIG. 2 is a diagram when a camera array with different focal lengths 200 as a specific example of the image capturing unit 101 of FIG. 2 is viewed from above an optical axis and 16 single cameras 201 in total are included. Symbol $f_i$ (i=1 to 4) written in the circle representing the single camera 201 indicates the focal length of each single camera 201 and the larger the numerical value of i, the greater the focal length is. Here, it is assumed that $f_1$=30 mm, $f_2$=60 mm, $f_3$=100 mm, and $f_4$=160 mm. A region 202 surrounded by a broken line in FIG. 2 will be described later. In the present embodiment, the camera array with different focal lengths is one in which four kinds of single cameras with different focal lengths $f_1$ to $f_4$ described above are arranged, but, the focal length of each single camera and the number of kinds of focal lengths are not limited to the above. Further, the configuration of the camera array with different focal lengths is not limited to that mentioned in FIG. 2 and it may also be possible to change the numbers of the single cameras 201 in the longitudinal and transverse directions and the layout itself (into a radial or circular layout) in accordance with the number of kinds of focal lengths.

Figure 29:
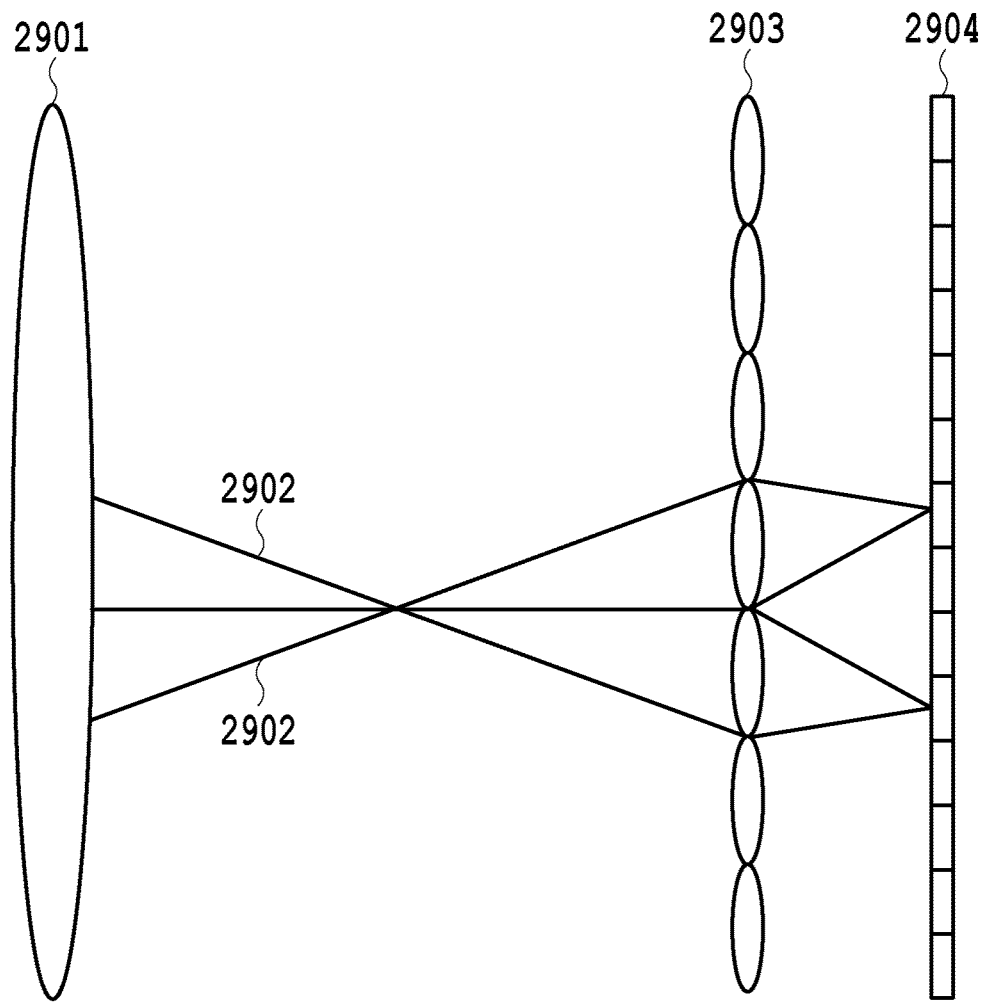
FIG. 29 is a diagram showing a configuration of a Plenoptic camera with different focal points, which is a specific example of an image capturing unit.
Figure 30:
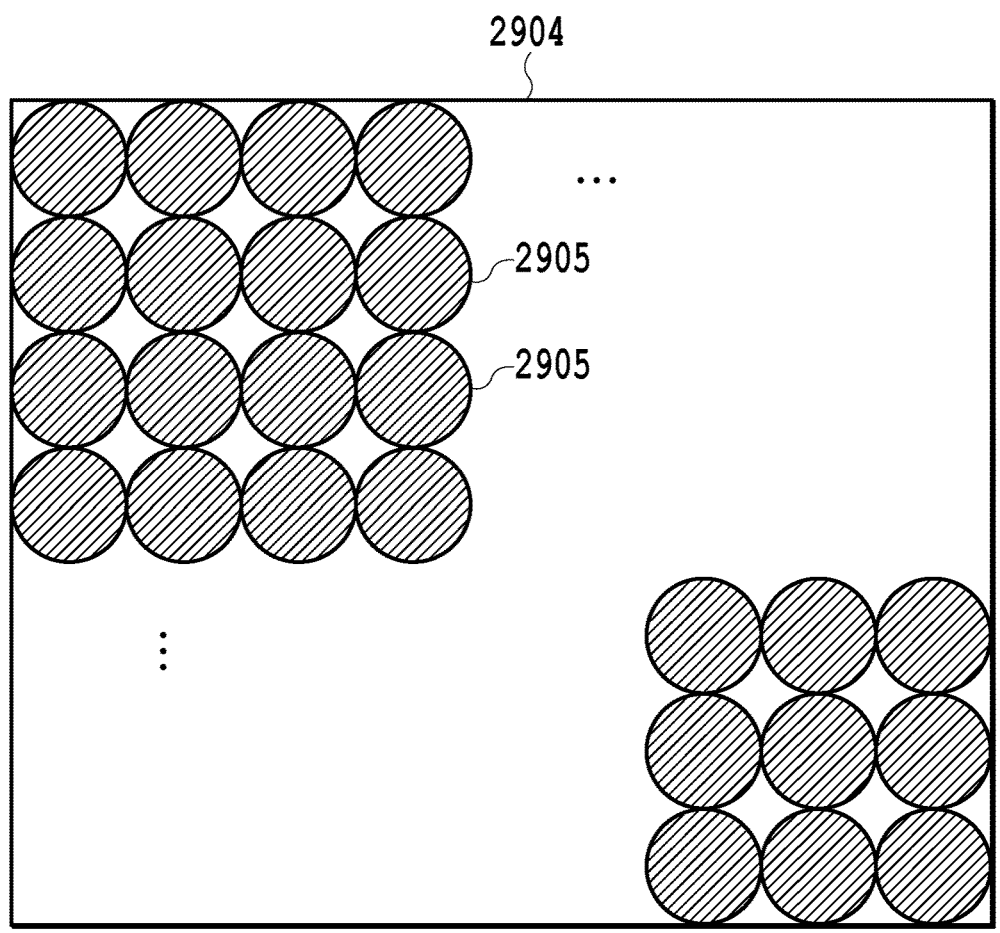
FIG. 30 is a diagram schematically representing how an image is formed on a sensor in the Plenoptic camera.

Note that, the image capturing unit 101 is not limited to the above-mentioned camera array with different focal points including a plurality of single cameras with different focal lengths and the image capturing unit 101 may be in the form of a Plenoptic camera. That is, the image capturing unit 101 may be a Plenoptic camera with different focal lengths in which a plurality of microlenses having two or more kinds of focal lengths exists mixedly. FIG. 29 is a diagram showing a configuration of a Plenoptic camera and shows the way a light beam 2902 passes through a main lens 2901 and a microlens array 2903 and reaches a sensor 2904. The microlens array 2903 is formed by arranging a plurality of compact lenses (hereinafter, referred to as a microlens) on a two-dimensional plane. In FIG. 29, the microlens array 2903 is represented one-dimensionally due to a limit of schematic representation. FIG. 30 is a diagram schematically representing how an image is formed on the sensor 2904 and representing the way the light having passed through each microlens configuring the microlens array 2903 forms a circular image 2905.

(Output Image Generating Unit)

Next, details of the output image generating unit 105 are explained.

Figure 3:
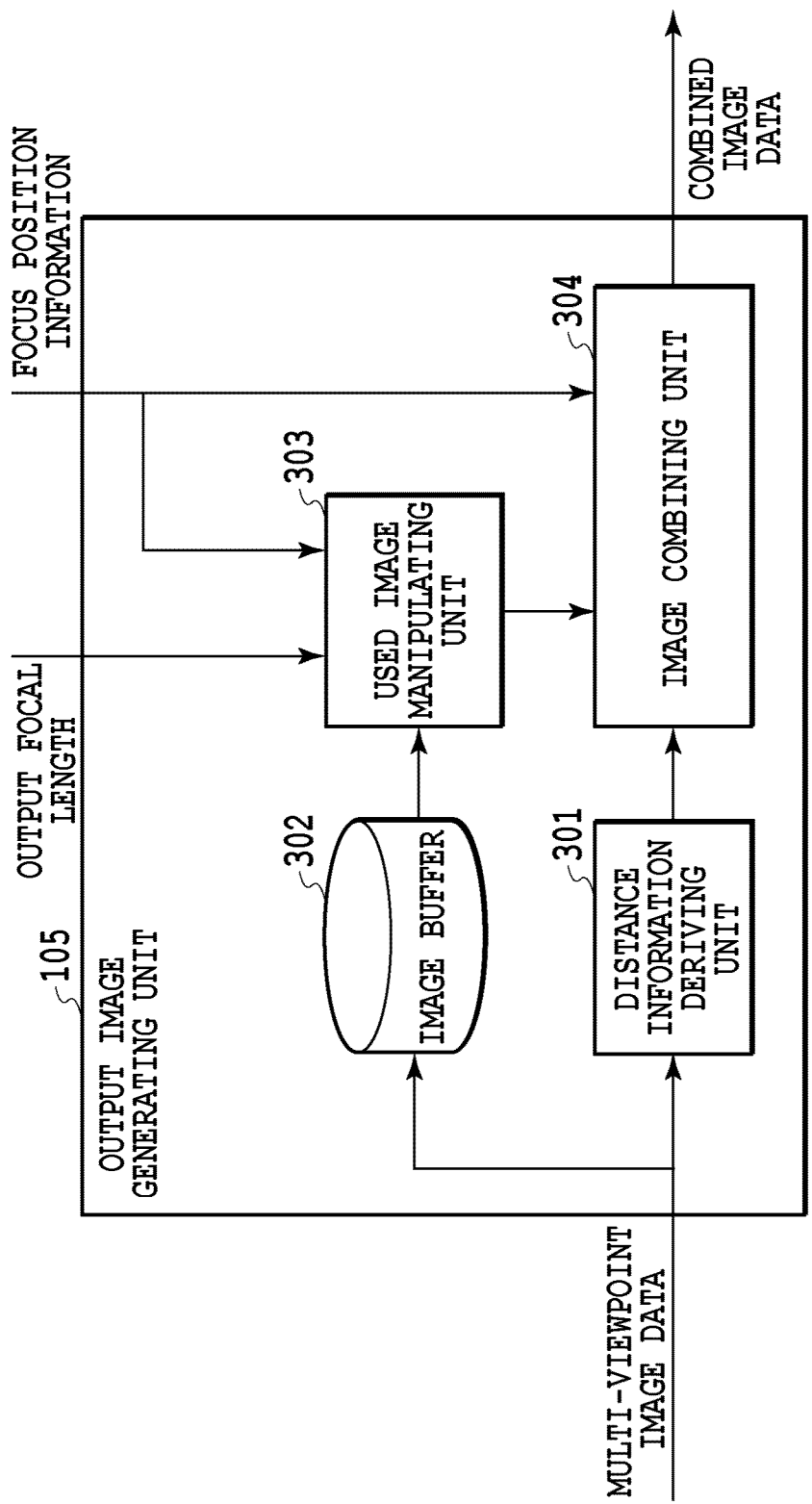
FIG. 3 is a diagram showing an example of an internal configuration of an output image generating unit.

FIG. 3 is a diagram showing an example of an internal configuration of the output image generating unit 105.

The output image generating unit 105 includes a distance information deriving unit 301, an image buffer 302, a use image manipulating unit 303, and an image combining unit 304. Hereinafter, each unit is explained.

The distance information deriving unit 301 derives a distance to a subject in each pixel of an image using digital image data (multi-viewpoint image data) received from the A/D conversion unit 102. Here, it is assumed that the multi-viewpoint image data in the case where the image capturing unit 101 is the camera array as shown in FIG. 2 represents a set of image data acquired by each single camera 201. On the other hand, it is also assumed that the multi-viewpoint image data in the case where the image capturing unit 101 is the Plenoptic camera as shown in FIG. 29 represents a set of image data (data of the image corresponding to the circular image 2905 in FIG. 30) acquired by each microlens.

Figure 4:
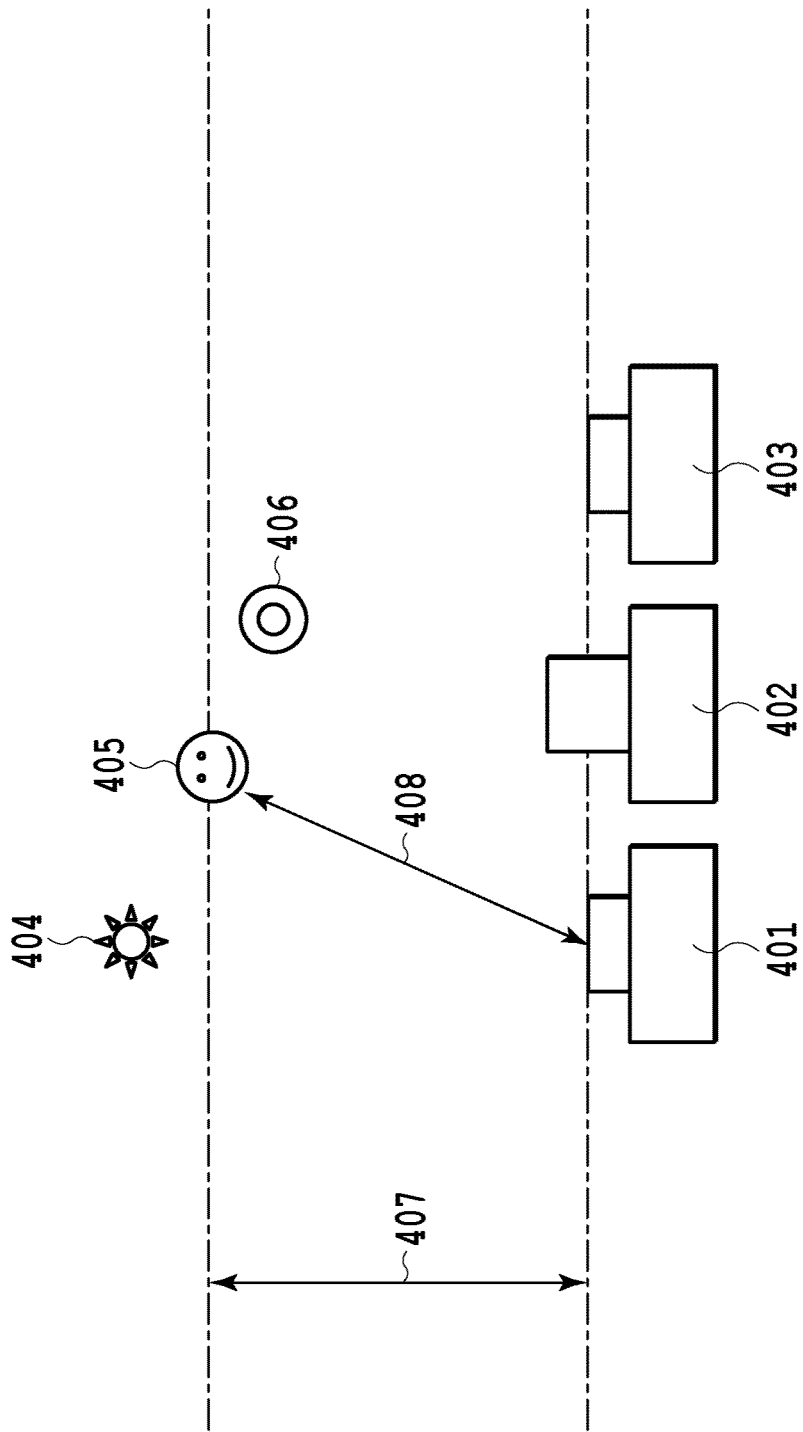
FIG. 4 is a diagram for explaining a definition of a distance to a subject.

FIG. 4 is a diagram for explaining a definition of a distance derived by the distance information deriving unit. Here, distances from single cameras 401, 402, and 403 included within the region 202 surrounded by the broken line of FIG. 2 to subjects 404, 405, and 406 are shown. In the present embodiment, it is assumed that a distance to a specific subject in an image is a distance (in the example in FIG. 4, a line segment 407) measured in the optical axis direction from the single camera with the shortest focal length (in the present embodiment, the single camera with the focal length $f_1$) to the subject. However, the definition of the distance to a subject is not limited to this and for example, a distance in a straight line from a single camera to a specific subject, such as a line segment 408, may be used.

As a method for deriving a distance to a subject, mention is made of, for example, a method for calculating a distance to a subject by obtaining an amount of parallax by searching for a corresponding point between a plurality of images in multi-viewpoint image data using a method, such as block matching, and by utilizing the result. Besides this, it may also be possible to measure the distance to each subject by a distance-measuring sensor.

The image buffer 302 temporarily stores multi-viewpoint image data, which is digital data of a plurality of images with a parallax, received from the A/D conversion unit 102.

The use image manipulating unit 303 performs resolution conversion in accordance with the output focal length that is set and trimming to match the angles of view on the image data captured by the single cameras with a focal length equal to or less than the output focal length set by the focal length setting unit 104.

The image combining unit 304 performs combination processing based on the focus position information, the output focal length, etc., and generates combined image data.

Subsequently, a flow of processing in the output image generating unit 105 is explained.

Figure 5:
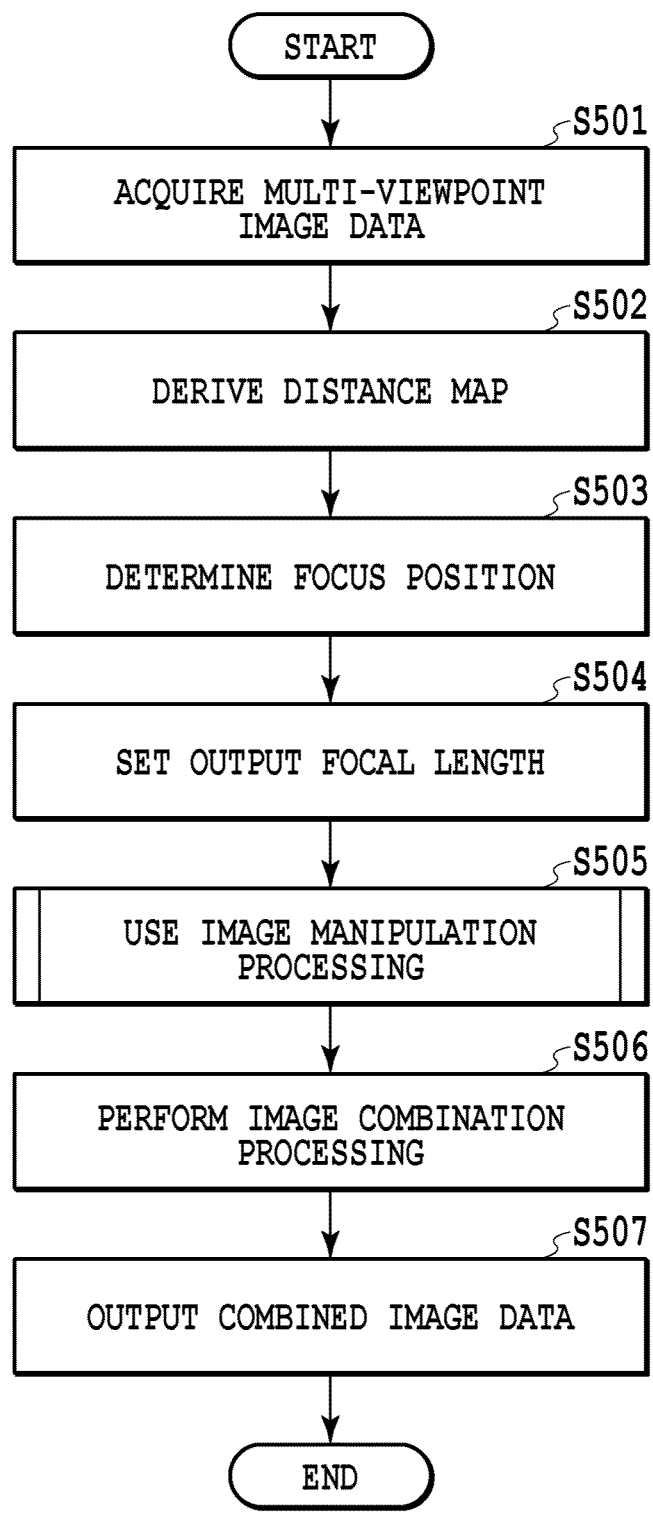
FIG. 5 is a flowchart showing a flow of processing in the output image generating unit.

FIG. 5 is a flowchart showing a flow of processing in the output image generating unit 105.

Figure 6:
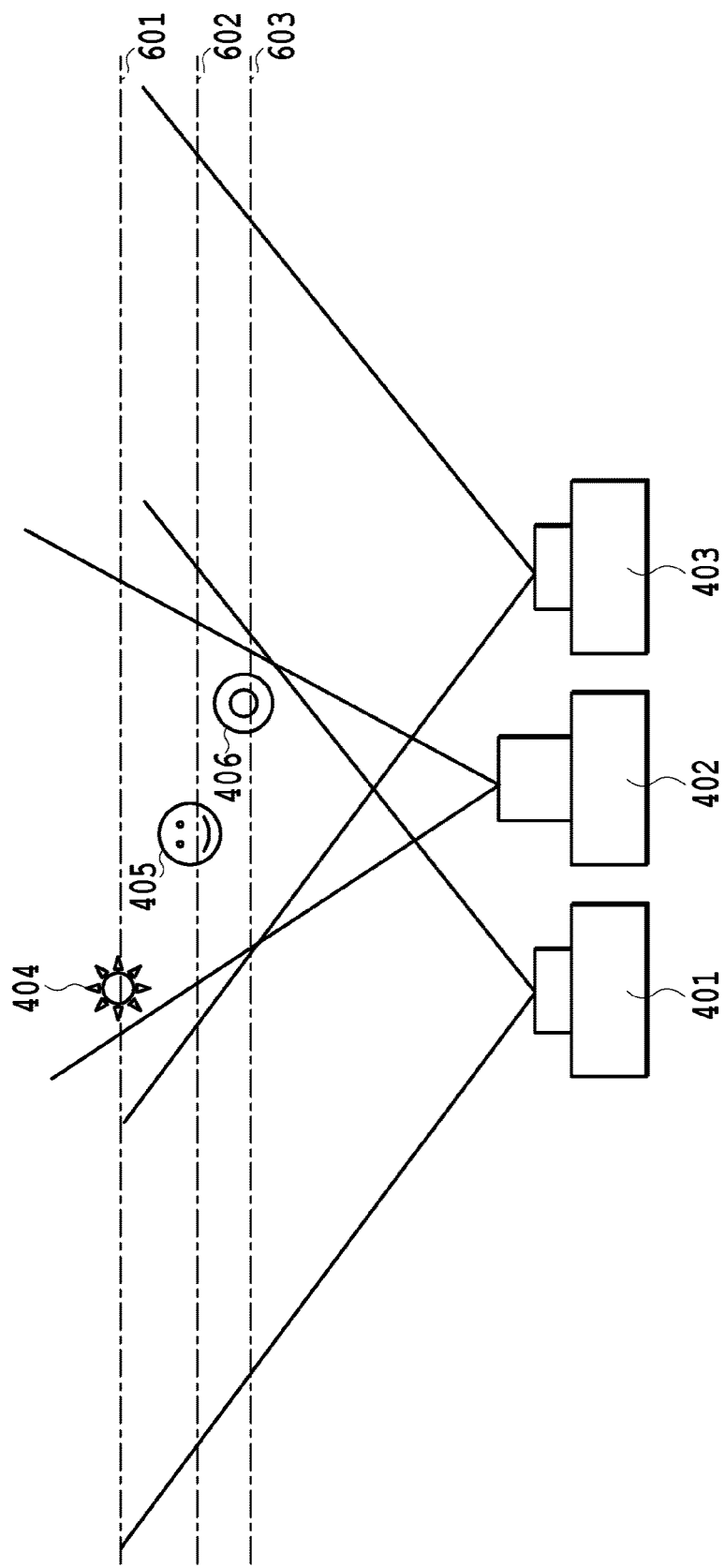
FIG. 6 is a diagram showing the way at the time of image capturing of multi-viewpoint image data.
Figure 7:
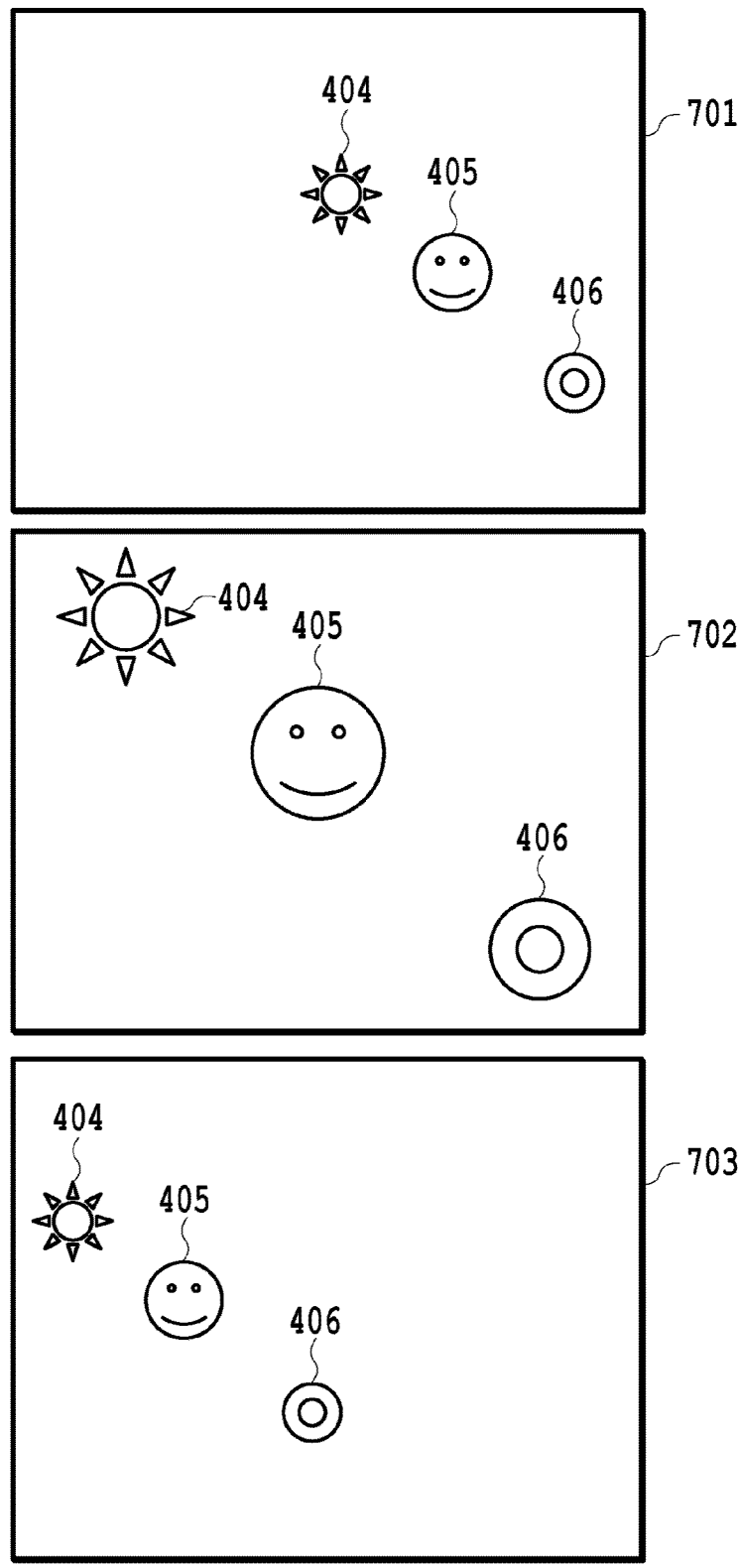
FIG. 7 is a diagram showing an example of images captured by a camera array with different focal lengths.

At step 501, the output image generating unit 105 receives multi-viewpoint image data from the A/D conversion unit 102 through an image data input terminal, not shown schematically. The received multi-viewpoint image data is sent to the distance information deriving unit 301 and the image buffer 302. FIG. 6 is a diagram showing the way at the time of image capturing of the multi-viewpoint image data received at the present step. The example of FIG. 6 shows the way the images of the subjects 404 to 406 located at different distances, respectively, are captured by the single cameras 401 to 403 within the region 202 surrounded by the broken line of FIG. 2. In this case, the focal length of the single cameras 401 and 403 is $f_1$ (30 mm) and the focal length of the single camera 402 is $f_2$ (60 mm), and therefore, the focal length of the single cameras 401 and 403 is shorter (wider angle) than the focal length of the single camera 402. Broken line segments 601, 602, and 603 show positions of the focus planes of the subjects 404, 405, and 406, respectively. FIG. 7 shows each image captured in the state of FIG. 6 and it is known that images 701 and 703 captured by the single cameras 401 and 403 are wider-angle images compared with an image 702 captured by the single camera 402.

Explanation is returned to the flowchart of FIG. 5.

Figure 8:
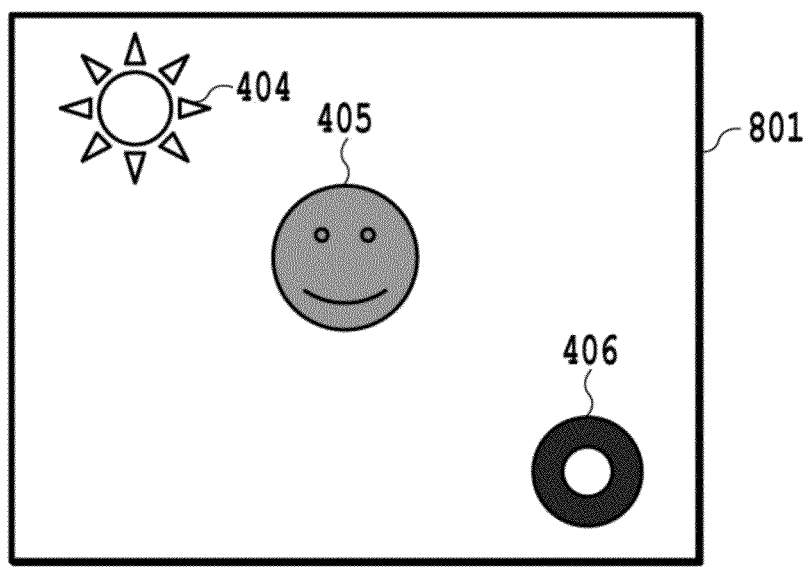
FIG. 8 is a diagram showing an example of a distance map.

At step 502, the distance information deriving unit 301 derives the distance to the subject viewed from each viewpoint using the received multi-viewpoint image data and generates a distance map. Here, a distance map is data storing distance values to subjects corresponding to pixels in place of pixel values in an image viewed from a certain viewpoint. FIG. 8 is a diagram showing an example of a distance map, representing the distance map in the case where images are captured by the single camera 402 (distance map corresponding to the captured image 702 shown in FIG. 7) as an image. In the distance map that is generated, actual distance values are stored, but, the distance map is represented as an image by normalizing the distance values to [0, 255] for an intuitive understanding. The subject 404 is represented in white, the subject 405 in gray, and the subject 406 in black and this indicates that the subject 404 exists in the farthest (deepest) position and the subject 406 exists in the nearest (front) position. That is, the image shows that the smaller the pixel value (that is, the darker the subject), the nearer the subject exists. In the example of this distance map, the distance values of all the subjects (background) deeper than the subject 404 are rounded to the distance of the subject 404, and therefore, the subject 404 and the background are both represented in white.

Explanation is returned to the flowchart of FIG. 5.

At step 503, the focus position determining unit 103 determines the focus position based on a specification of a user or predetermined automatic processing using the publicly-known face recognition technique etc. Information of the focus position determined at step 503 is sent to the use image manipulating unit 303 and the image combining unit 304 via a focus position input terminal, not shown schematically.

Figure 9:
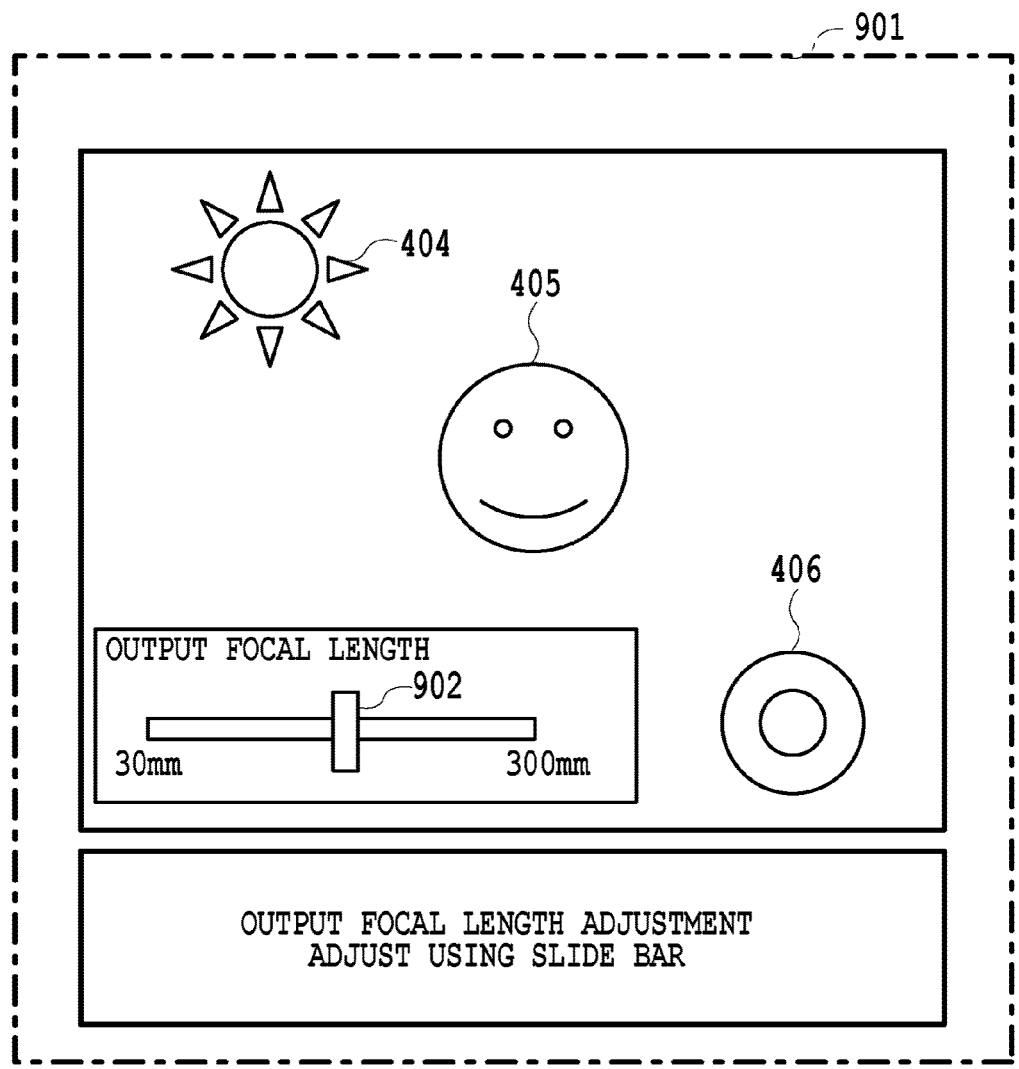
FIG. 9 is a diagram showing an example of a UI screen used when a user specifies an output focal length.

At step 504, the focal length setting unit 104 sets the focal length of combined image data to be output (output focal length) based on a specification of a user. FIG. 9 shows an example of a UI screen used when a user specifies an output focal length. In a UI screen 901, when a user adjusts a slide bar 902, the angle of view of a displayed image changes, and therefore, it is possible for the user to specify a desired focal length while checking the angle of view. It may also be possible to set the output focal length to the same value of the focal length of the single camera or to a value different from the focal length of the single camera. It is not necessarily required to match the range of the output focal length that can be specified with the range of the focal length of each single camera configuring the camera array with different focal lengths. For example, in the present embodiment, the greatest focal length of the single cameras is 160 mm, but, it is possible to obtain combined image data with a greater focal length by performing interpolation processing, such as the bilinear method, or super-resolution processing (processing to increase resolution). Because of this, in the example of FIG. 9, the upper limit of the output focal length that can be set is set to 300 mm. The UI screen 901 is only an example and any UI may be accepted as long as a user can specify a focal length at his/her own accord and not limited to that shown in FIG. 9. Information of the set output focal length is sent to the use image manipulating unit 303 via an output focal length input terminal, not shown schematically.

Explanation is returned to the flowchart of FIG. 5.

Figure 10:
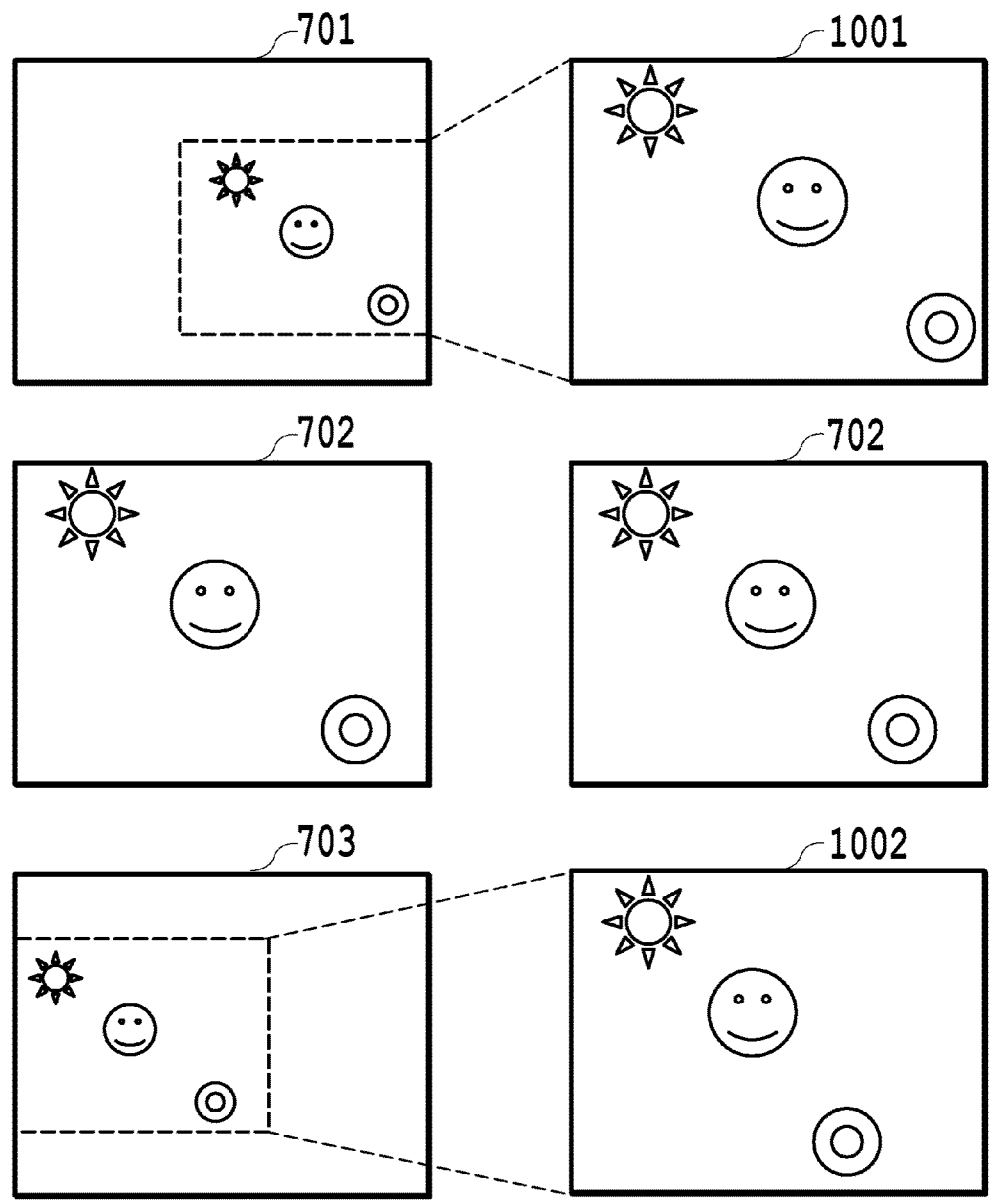
FIG. 10 is a diagram for explaining the way angles of view are matched by resolution conversion and trimming in the present embodiment.

At step 505, the use image manipulating unit 303 performs use image manipulation processing. Specifically, the use image manipulating unit 303 first reads image data of the single camera with a focal length shorter than the set output focal length from the image buffer 305 and performs resolution conversion processing on the read image data. Further, the use image manipulating unit 303 performs trimming for matching the angle of view on the image data subjected to resolution conversion. For example, it is assumed that an output focal length $f_{out}$ equal to the focal length $f_2$ of the single camera 402 is set for the multi-viewpoint image data of the captured images 701 to 703 of FIG. 7. In this case, trimming is performed so that the angles of view of the captured images 701 and 703 captured by the single cameras 401 and 403 with a focal length shorter than that of the single camera 402 match with the angle of view of the single camera 402. FIG. 10 is a diagram for explaining the way the angles of view are matched by resolution conversion and trimming in the present embodiment. An image 1001 and an image 1002 (hereinafter, these images are referred to as "converted images") are shown, which are trimmed after resolution conversion so that the range of the angle of view is the same as that of the captured image 702. Details of the use image manipulation processing will be described later.

At step 506, the image combining unit 304 performs image combination processing in accordance with the set output focal length to generate combined image data using the data of the converted image subjected to resolution conversion by the use image manipulating unit 303. Details of the image combination processing will be described later.

At step 507, the image combining unit 304 outputs the generated combined image data to the display unit 106 via a combined image data output terminal, not shown schematically, and exits the present processing.

(Use Image Manipulation Processing)

Next, details of the use image manipulation processing are explained. Here, explanation is given on the assumption that the multi-viewpoint image data that is input is captured by the camera array with different focal lengths 200 configured by the single cameras with the four kinds of focal lengths ($f_1$ to $f_4$) shown in FIG. 2. In this case, to each single camera 201, a consecutive number $m_i$ is attached for each focal length $f_i$ and in the case of the camera array with different focal lengths 201 shown in FIG. 2, i in the consecutive number $m_i$ takes values of 1 to 4. However, the output focal length $f_{out} \geq f_1$. Further, the focal length the value of which is the nearest to the output focal length $f_{out}$ (hereinafter, referred to as "near output focal length") of the single cameras with a focal length equal to or less than the output focal length $f_{out}$ is taken to be $f_j$.

Figure 11:
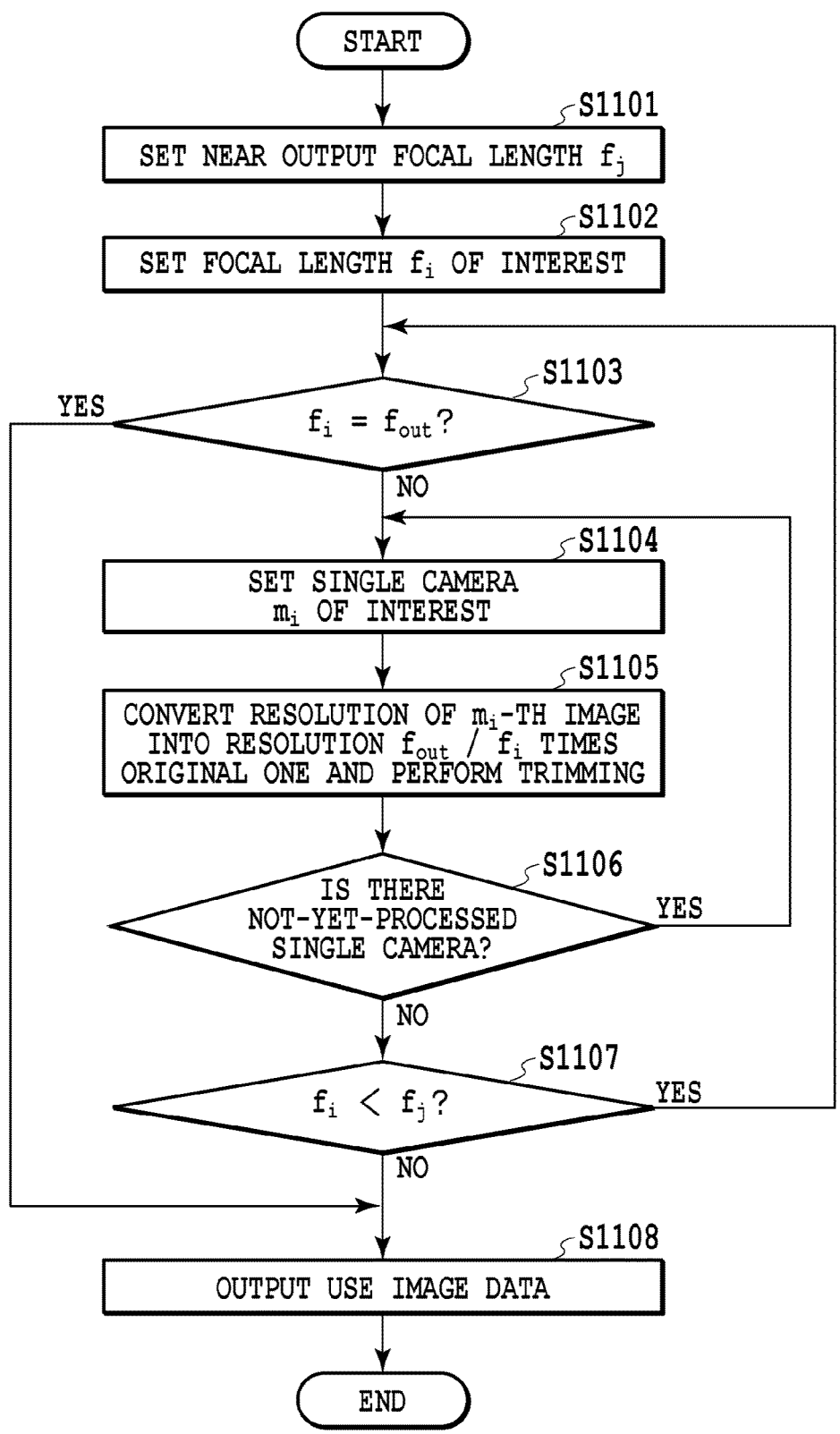
FIG. 11 is a flowchart showing a flow of use image manipulation processing.

FIG. 11 is a flowchart showing a flow of use image manipulation processing.

At step 1101, the use image manipulating unit 303 sets the near output focal length $f_j$. For example, in the case where the set output focal length $f_{out}$ is 120 mm, $f_3$ (100 mm)<$f_{out}$<$f_4$ (160 mm), and therefore, the near output focal length $f_j$=$f_3$ (100 mm) is set. In the case where the set output focal length $f_{out}$ is 200 mm, $f_j$=$f_4$ (160 mm) is set.

At step 1102, the use image manipulating unit 303 sets the focal length $f_i$ of interest. In the stage of start of processing, as an initial value, i=1 ($f_1$: 30 mm) is set.

At step 1103, the use image manipulating unit 303 determines whether the focal length $f_i$ of interest and the output focal length $f_{out}$ are equal. As a result of determination, in the case where they are not equal, the procedure proceeds to step 1104. On the other hand, in the case where they are equal, the procedure proceeds to step 1108.

At step 1104, the use image manipulating unit 303 sets the single camera $m_i$ of interest. In the stage of start of processing, as an initial value, i=1 ($m_1$) is set.

Figure 12:
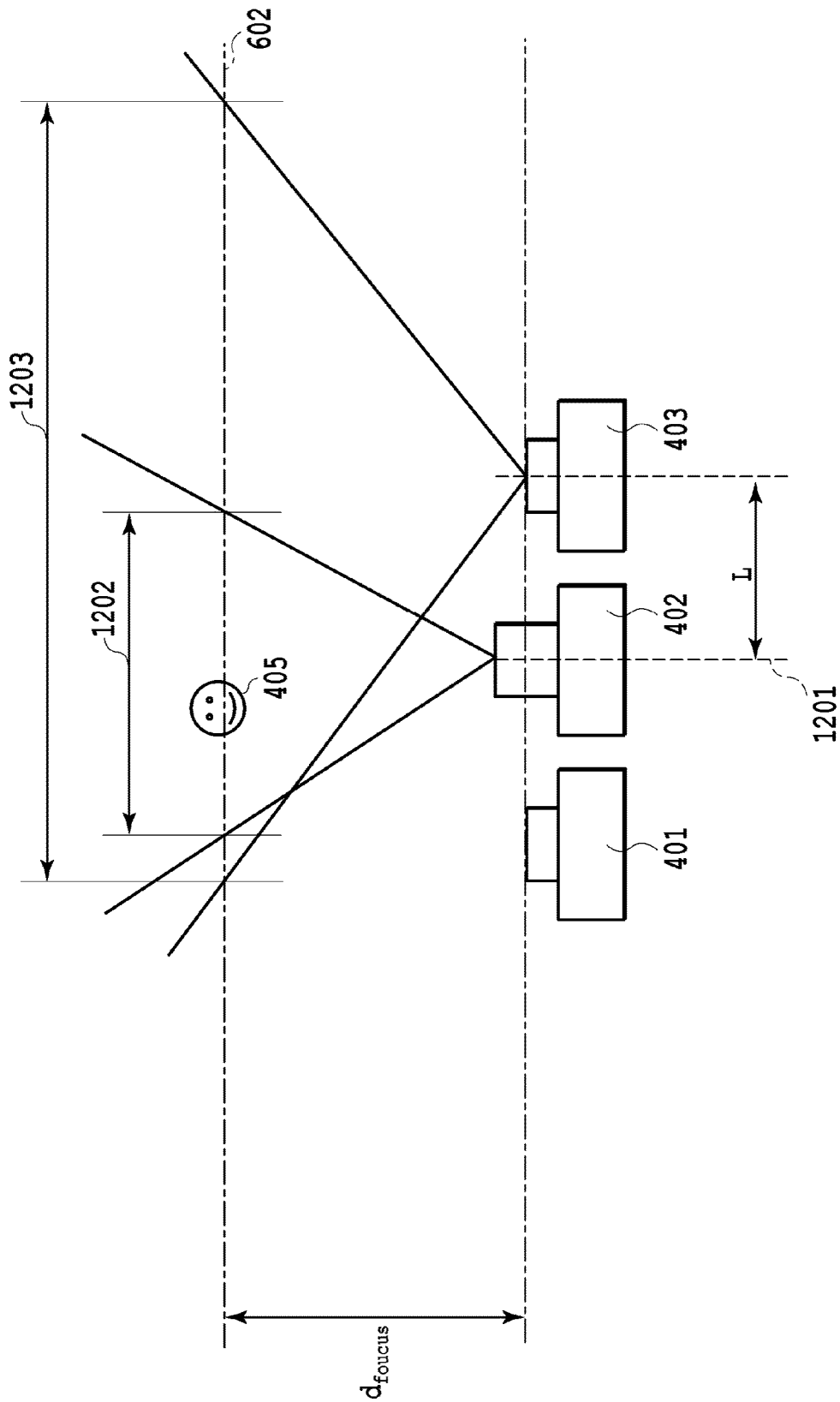
FIG. 12 is a diagram for explaining a method for obtaining a region where trimming is performed.

At step 1105, the use image manipulating unit 303 first converts the resolution of the captured image of the $m_i$-th single camera that is set into a resolution $f_{out}/f_i$ times the original resolution. As the resolution conversion method, for example, enlargement using interpolation processing by the bilinear method or bi-cubic method is applied. Of course, it may also be possible to perform resolution conversion by another method, such as super-resolution. Then, the image subjected to resolution conversion is trimmed so that the range of angle of view of the image subjected to resolution conversion becomes the same as that in the case where image capturing is performed with $f_{out}$. FIG. 12 is a diagram for explaining a method for obtaining a region where trimming is performed. In FIG. 12, reference numeral 1201 represents the coordinate axis, 1202 represents the range of angle of view that the single camera 402 covers, and 1203 represents the range of angle of view that the single camera 403 covers. Reference symbol L represents an interval between the single camera 402 and the single camera 403 and $d_{focus}$ represents a distance to the focus plane. In the case where the focal length of the single camera 402 is $f_2$, the corresponding angle of view is $\theta_2$, the focal length of the single camera 403 is $f_1$, and the corresponding angle of view is $\theta_1$, the coordinate range of the range of angle of view 1203 is represented by Formula (1) below.

$$(-d_{focus}\tan(\theta_1/2)+L, d_{focus}\tan(\theta_1/2)+L) \quad \text{Formula (1)}$$

Similarly, the coordinate range of the range of angle of view 1202 is represented by Formula (2) below.

$$(-d_{focus}\tan(\theta_2/2), d_{focus}\tan(\theta_2/2)) \quad \text{Formula (2)}$$

Consequently, if the number of pixels of the captured image is taken to be P, the pixel position at the left end when trimming the image can be obtained by Formula (3) below.

[Expression 1]

$$\max\left(\frac{\left(-\tan\left(\frac{\theta_2}{2}\right)+\tan\left(\frac{\theta_1}{2}\right)-\frac{L}{d_{focus}}\right)P}{\tan\left(\frac{\theta_1}{2}\right)}, 0\right) \quad \text{Formula (3)}$$

Similarly, the pixel position at the right end when trimming the image can be obtained by Formula (4) below.

[Expression 2]

$$\max\left(\frac{\left(\tan\left(\frac{\theta_2}{2}\right)-\tan\left(\frac{\theta_1}{2}\right)-\frac{L}{d_{focus}}\right)P}{\tan\left(\frac{\theta_1}{2}\right)}, P\right) \quad \text{Formula (4)}$$

Here, the method for calculating the trimming range in the case where the single cameras are aligned horizontally is shown, but, it is possible to derive the trimming range from the gravity center coordinates of the single cameras similarly also in the case where they are aligned vertically or obliquely.

Explanation is returned to the flowchart of FIG. 11.

At step 1106, the use image manipulating unit 303 determines whether the resolution conversion and trimming are completed for all the single cameras with the focal length $f_i$ of interest. As specific processing, for example, whether $m_i$ is smaller than a maximum value $M_i$ is determined. In the case where $m_i$<$M_i$ (in the case where the resolution conversion and trimming are not completed for all the single cameras of interest with the focal length $f_i$ of interest), the procedure returns to step 1104 and the next single camera ($m_i+_1$) of interest is set. On the other hand, in the case where $m_i$=$M_i$ (in the case where the resolution conversion and trimming are completed for all the single cameras of interest with the focal length $f_i$ of interest), the procedure proceeds to step 1107.

At step 1107, the use image manipulating unit 303 determines whether the processing has been performed for all the focal lengths $f_i$ equal to or less than the set output focal length $f_{out}$. Specifically, whether the focal length $f_i$ of interest that is being set is smaller than the near output focal length $f_j$ is determined. In the case where $f_i < f_j$ (in the case where the processing is not completed yet for all the focal lengths $f_i$ equal to or less than the output focal length $f_{out}$), the procedure returns to step 1102 and the next focal length $(f_i+_1)$ of interest is set. On the other hand, in the case where $f_i = f_j$ (in the case where the processing is completed for all the focal lengths $f_i$ equal to or less than the output focal length $f_{out}$), the procedure proceeds to step 1108.

At step 1108, the use image manipulating unit 303 outputs an image data group (use image data) used for combined image processing in accordance with the set output focal length to the image combining unit 304.

For example, in accordance with the set output focal length $f_{out}$, each piece of image data as below is output as use image data.

First, in the case where the set output focal length $f_{out}$ is 100 mm, the converted image data obtained by performing the above-mentioned resolution conversion on the captured image data of the single cameras with the focal lengths $f_1$ and $f_2$ and the captured image data (for which resolution conversion is not performed) of the single camera with the focal length $f_3$ are output.

In the case where the set output focal length $f_{out}$ is 200 mm, the converted image data obtained by performing the above-mentioned resolution conversion on the captured image data of all the single cameras with the focal lengths $f_1$ to $f_4$ is output.

(Image Combination Processing)

Next, details of the image combination processing are explained.

Figure 13:
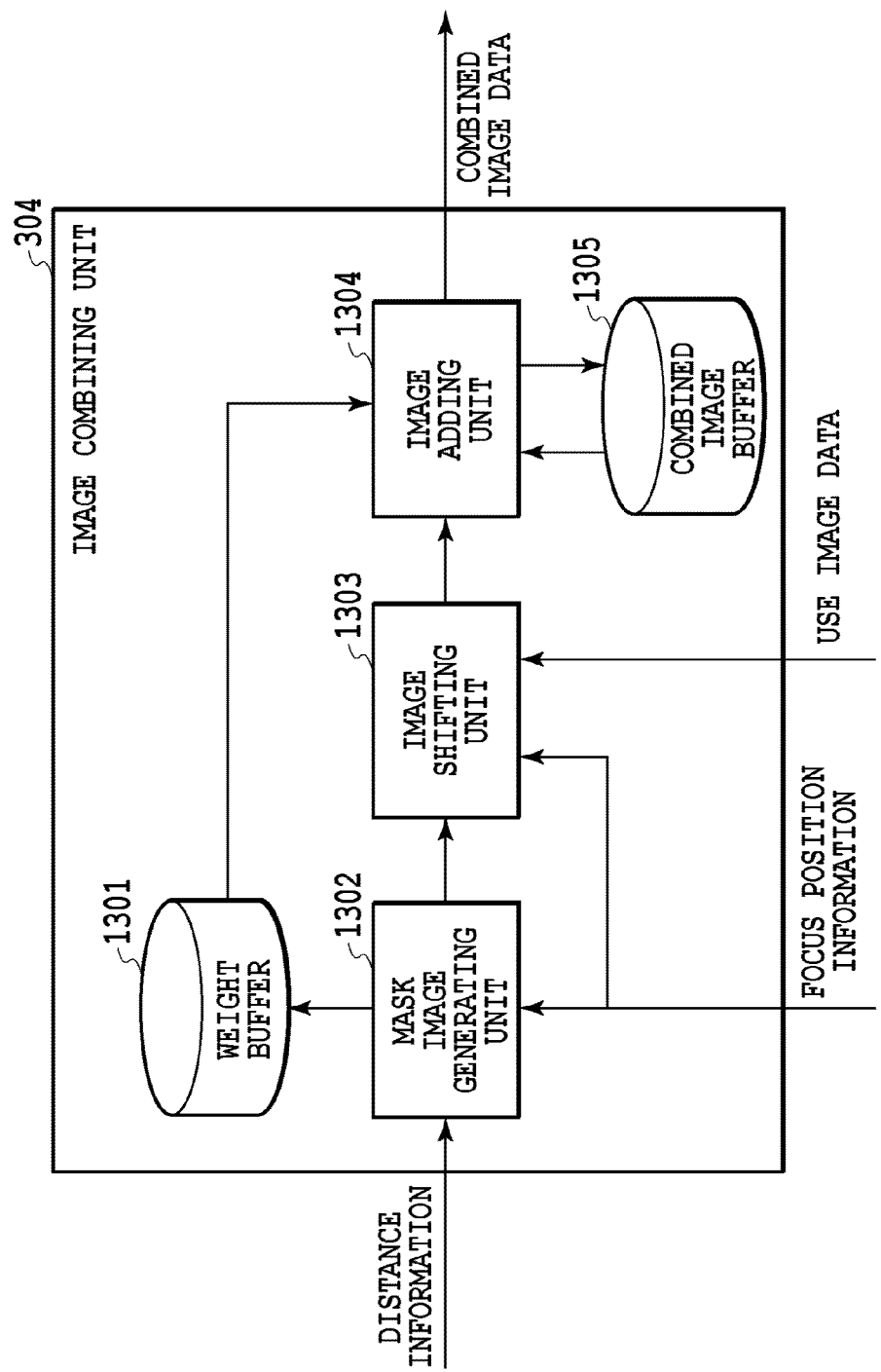
FIG. 13 is a diagram showing an example of an internal configuration of an image combining unit.

FIG. 13 is a diagram showing an example of the internal configuration of the image combining unit 304. The image combining unit 304 includes a weight buffer 1301, a mask image generating unit 1302, an image shifting unit 1303, an image adding unit 1304, and a combined image buffer 1305. Hereinafter, each unit is explained.

The weight buffer 1301 stores a weight $C_{mi}$ corresponding to the image captured by each single camera and a weight C (x, y) of each pixel. Here, the weight C (x, y) of each pixel is represented by Formula (5) below.

[Expression 3]

$$C(x, y) = \sum_{i=1}^{J} \sum_{m_1} c_{m_i} \text{mask}_{m_i}(x, y)$$  Formula (5)

The mask image generating unit 1302 generates a mask image $\text{mask}_{mi}$ (x, y). Details of the mask image generation processing will be described later.

The image shifting unit 1303 multiplies an image $I_{mi}$ (x, y) by the mask image $\text{mask}_{mi} I_{mi}'$ (x, y) to generate a new image (x, y) and generates a shifted image $I_{mi}''$ (x, y) by shifting the whole image.

The image adding unit 1304 multiplies the shifted image $I_{mi}''$ (x, y) by the weight $C_{mi}$ and calculates the sum of the use image data sent from the use image manipulating unit 303 and divides the sum by the above-described weight C (x, y) of each pixel.

The combined image buffer 1305 stores image data $I_{out}$ (x, y) after combination.

Figure 14:
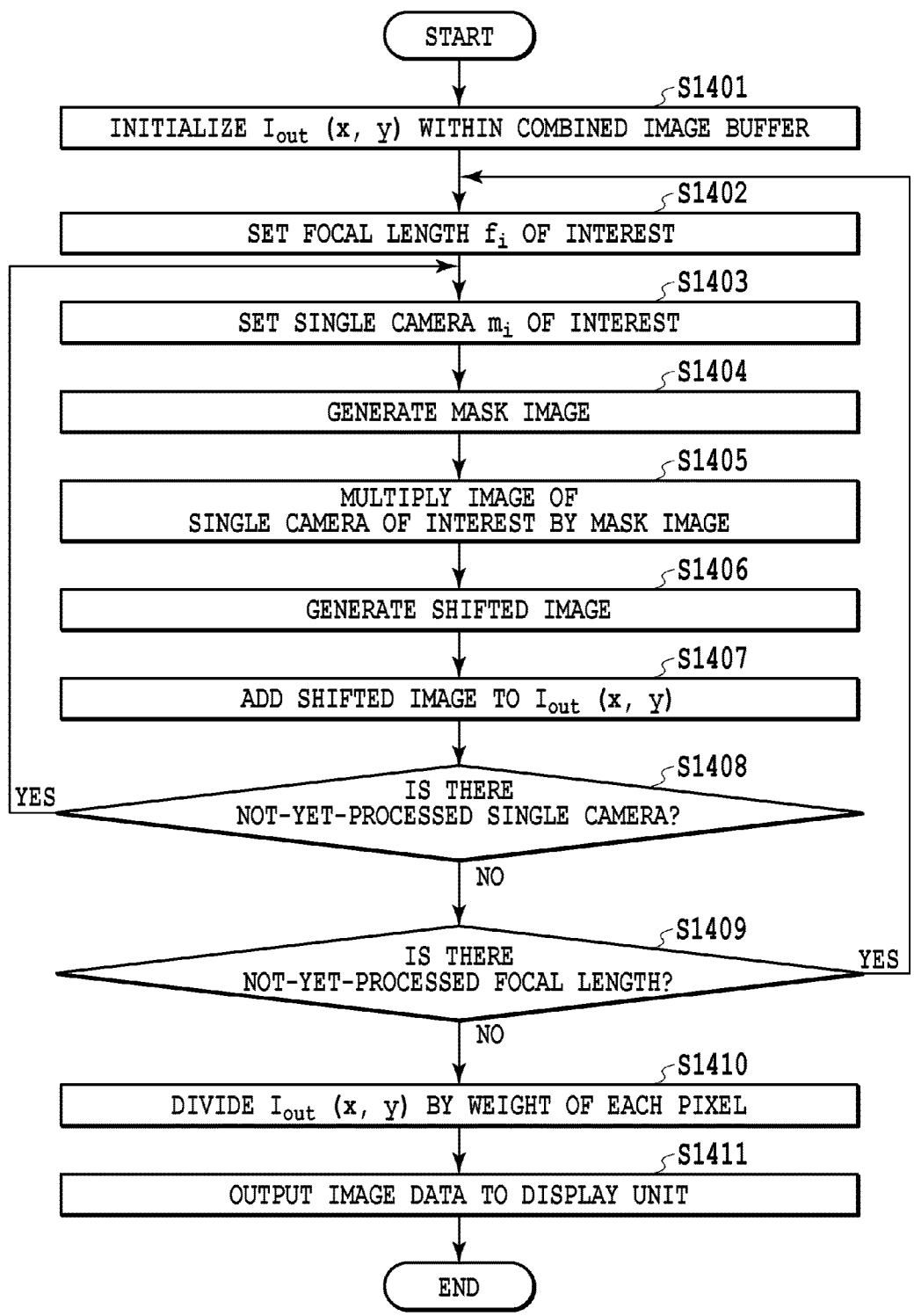
FIG. 14 is a flowchart showing a flow of image combination processing.

FIG. 14 is a flowchart showing a flow of image combination processing.

At step 1401, the image combining unit 304 performs initialization by setting to zero the values of all the pixels of the image $I_{out}$ (x, y) stored in the combined image buffer 1305.

At step 1402, the image combining unit 304 sets the focal length $f_i$ of interest. In the stage of start of processing, as an initial value, i=1 ($f_1$) is set.

At step 1403, the image combining unit 304 sets the single camera $m_i$ of interest from among the single cameras having a focal length of the set focal length $f_i$ of interest. In the stage of start of processing, as an initial value, i=1 ($m_1$) is set.

Figure 15:
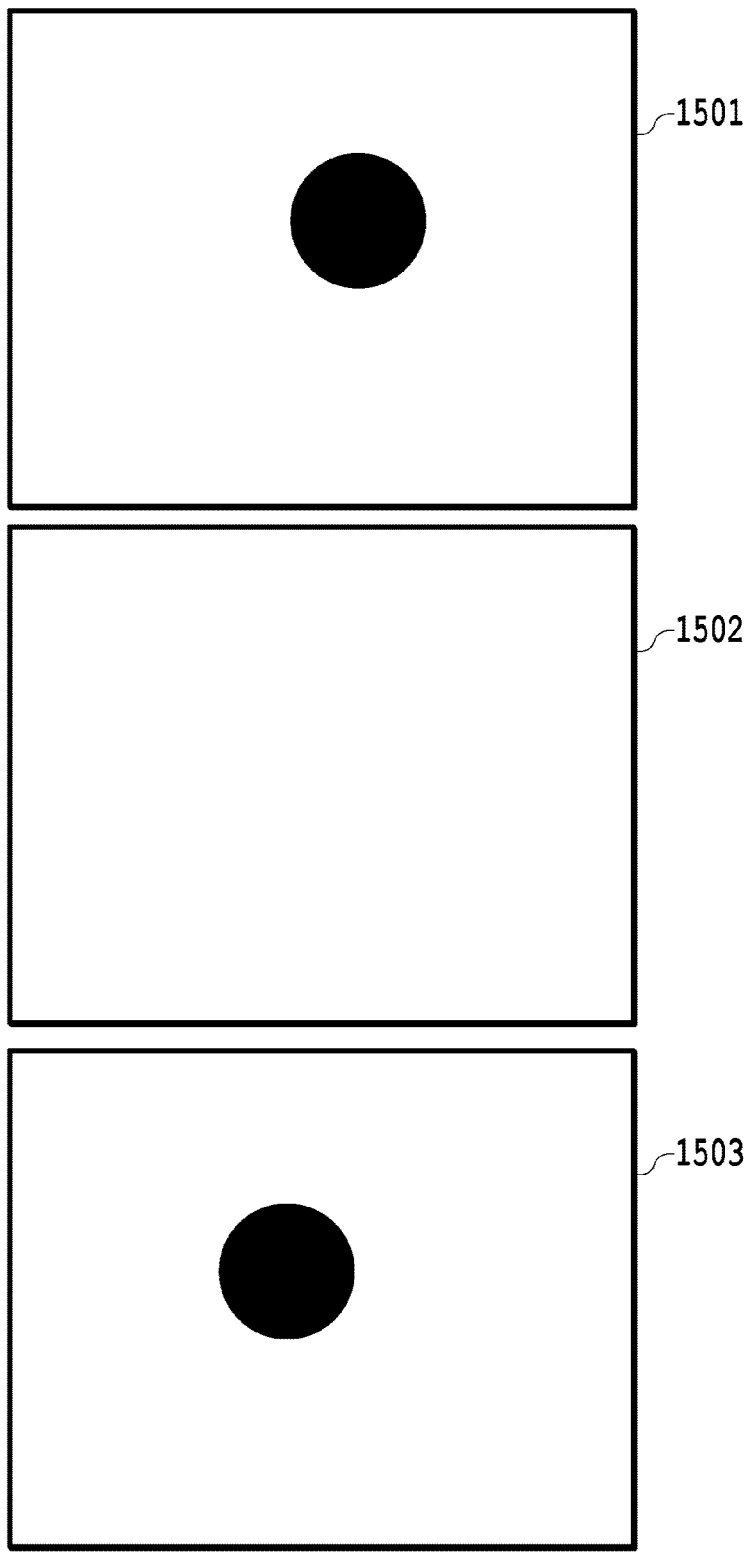
FIG. 15 is a diagram showing an example of mask images in the first embodiment.

At step 1404, the mask image generating unit 1302 generates a mask image. Specifically, in accordance with the focal length $f_i$ of interest, the mask image $\text{mask}_{mi}$ (x, y) is generated as follows. First, in the case where the focal length $f_i$ of interest that is being set is smaller than the near output focal length $f_j$ described above, the mask image is generated based on the information of distance to the subject (distance map) and the focus position information. That is, a mask image is generated so that $\text{mask}_{mi}$ (x, y)=0 for the pixel (x, y) in focus and $\text{mask}_{mi}$ (x, y)=1 for the pixel (x, y) out of focus. Moreover, in the case where the focal length $f_i$ of interest that is being set is equal to a focal length $f_j$ the value of which is the nearest to the above-described output focal length $f_{out}$, a mask image is generated so that $\text{mask}_{mi}$ (x, y)=1 for all the pixels (x, y). FIG. 15 is a diagram showing an example of the mask images generated at the present step and a mask image 1501 corresponding to the converted image 1001 described above, a mask image 1502 corresponding to the captured image 702, and a mask image 1503 corresponding to the converted image 1002 are shown. Here, the pixel value of the black parts within the mask images 1501 and 1503 is zero and the pixel value of the other white part (and the whole of the mask image 1502) is one. In the mask images shown in FIG. 15, the focus plane is supposed to be at the position shown by 602 in FIG. 6 and it is known that the pixel value of the region corresponding to the subject 405 is zero in the mask images 1501 and 1503. The reason for the generation of such mask images is that the resolution of the focus plane is prevented from deteriorating in the case where image data captured by single cameras with different focal lengths is combined.

Explanation is returned to the flowchart of FIG. 14.

At step 1405, the image shifting unit 1303 multiplies the image $I_{mi}$ (x, y) captured by the single camera $m_i$ of interest by the generated mask image $\text{mask}_{mi}$ (x, y) for each pixel to generate the new image $I_{mi}'$ (x, y).

At step 1406, the image shifting unit 1303 shifts the whole of the generated new image $I_{mi}'$ (x, y) to generate the shifted image $I_{mi}''$ (x, y). FIG. 16 is a diagram for explaining the way a shifted image is generated. Here, a case is supposed where the subject 405 in the captured image 702 is brought into focus. In FIG. 16, between the captured image 702 and the converted image 1002, there exists a parallax 1601 corresponding to an amount represented by a double-sided arrow with respect to the subject 405. Then, in a shifted image 1602, the whole of the captured image 1002 is shifted in the rightward direction by an amount of a vector 1603 equal to the amount of the parallax 1601.

Here, a method for deriving an amount of shift is explained.

Figure 17:
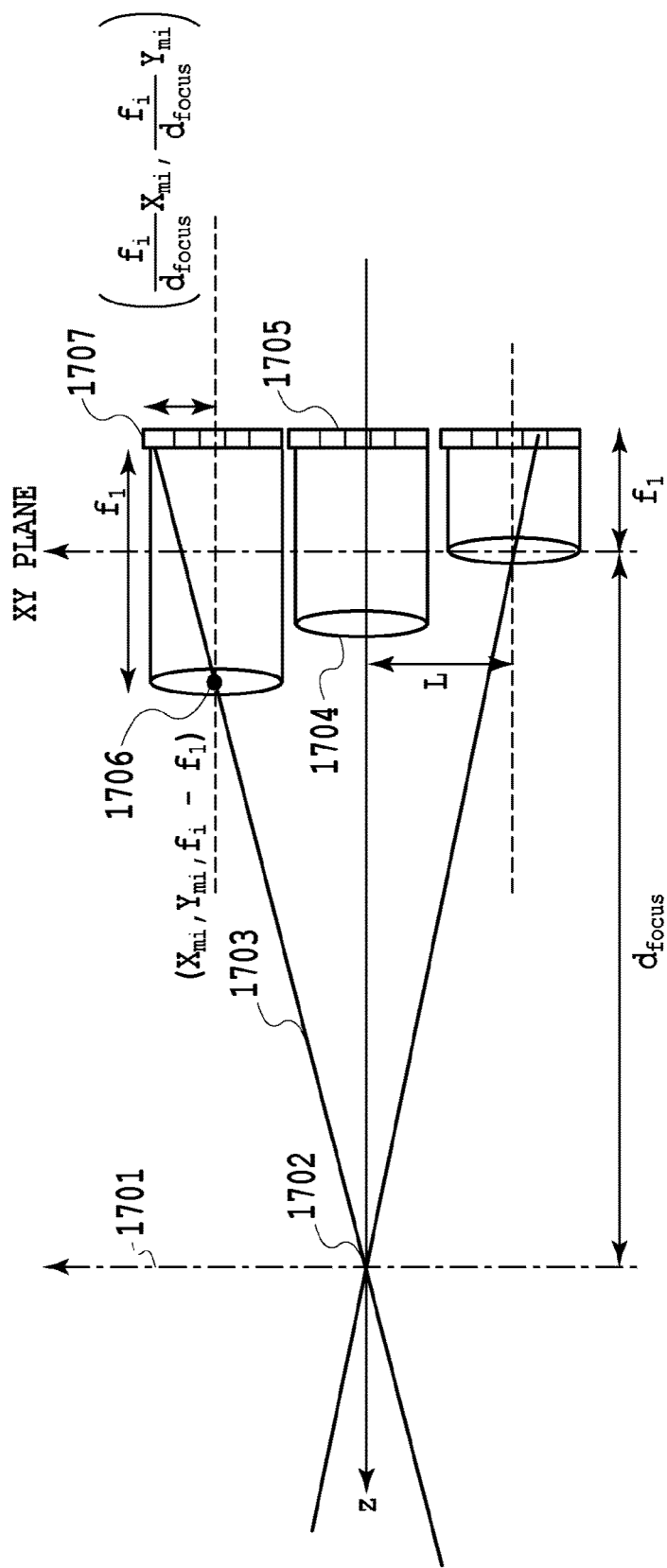
FIG. 17 is a diagram showing at which position the image of a subject on a focus plane is formed on a sensor of a single camera.

FIG. 17 is a diagram showing at which position the image of a subject on a focus plane is formed on a sensor of a single camera. In FIG. 17, reference numeral 1701 represents a focus plane, 1702 represents a subject on the focus plane, and 1703 represents a light beam reflected from the subject 1702. Reference numeral 1704 is a lens of a single camera and 1705 represents a sensor of the single camera. If a z-axis is taken to be parallel to the optical axis and the origin of the z-axis is taken to be the optical center of the single camera with the shortest focal length $f_1$, the coordinates of an optical center 1706 of the $m_i$-th single camera are $(X_{mi}, Y_{mi}, f_i\text{-}f_1)$. Reference numeral 1707 is a point at which the image of the subject 1702 is formed in the $m_i$-th single camera and the relative coordinates from the point at which the image of the subject 1702 is formed are about $(f_i X_{mi}/d_{focus}, f_i Y_{mi}/d_{focus})$. It is assumed that $d_{focus}$ is sufficiently large compared to $f_i$. Consequently, in the case where a pixel pitch of the sensor 1705 is taken to be $\Delta$, by shifting the image of the $m_i$-th single camera by $(-f_i X_{mi} \pm /\{d_{focus}\Delta\}, -f_i Y_{mi}/\{d_{focus}\Delta\})$, it is made possible for the subject 1702 to overlap on each image.

Explanation is returned to the flowchart of FIG. 14.

At step 1407, the image adding unit 304 updates the image $I_{out}(x, y)$ stored in the combined image buffer 1305 based on Formula (6) below. Specifically, the image $I_{out}(x, y)$ within the combined image buffer 1305 to which the generated shifted image $I_{mi}''(x, y)$ is added is updated to the new image $I_{out}(x, Y)$.

[Expression 4]

$$I_{out}(x,y) \to I_{out}(x,y) + c_{mi} I_{mi}''(x,y) \quad \text{Formula (6)}$$

At step 1408, the image combining unit 304 determines whether the processing is completed for all the single cameras with the focal length $f_i$ of interest that is being set. As specific processing, for example, whether $m_i$ is smaller than the maximum value (here, $M_i$) is determined. In the case where $m_i < M_i$ (in the case where the processing is not completed yet for all the single cameras with the focal length $f_i$ of interest that is being set), the procedure returns to step 1403 and the next single camera ($m_i+1$) of interest is set. On the other hand, in the case where $m_i = M_i$ (in the case where the processing is completed for all the single cameras with the focal length $f_i$ of interest that is being set), the procedure proceeds to step 1409.

At step 1409, the image combining unit 304 determines whether the processing has been performed for all the focal lengths equal to or less than the output focal length $f_{out}$. In the case where the processing is not completed yet for all the focal lengths equal to or less than the output focal length $f_{out}$, the procedure returns to step 1402 and the next focal length ($f_i+1$) of interest is set. On the other hand, in the case where the processing is completed for all the focal lengths equal to or less than the output focal length $f_{out}$, the procedure proceeds to step 1410.

At step 1410, the image adding unit 1304 updates the image $I_{out}(x, y)$ stored in the combined image buffer 1305 based on Formula (7) below. Specifically, the image $I_{out}(x, y)$ within the combined image buffer 1305 is divided by the weight $C(x, y)$ of each pixel represented by Formula (5).

[Expression 5]

$$I_{out}(x,y) \to I_{out}(x,y)/C(x,y) \quad \text{Formula (7)}$$

At step 1411, the image combining unit 304 outputs the image data (combined image data) of all the images $I_{out}(x, y)$ within the combined image buffer for which the processing is completed to the display unit 106 and exits the present processing.

FIG. 18 is a diagram showing an example of combined images generated by image combination processing. A combined image 1801 is an image generated by, with the focus plane taken to be 601 of FIG. 6, shifting the converted images 1001 and 1002 so that the position of the subject 404 agrees with each other and then adding them to the captured image 702. In the combined image 1801, the subject 404 is in focus and the subjects 405 and 406 are blurred. When the subject 405 and the subject 406 are compared, the subject 406 is more blurred.

A combined image 1802 is an image generated by, with the focus plane taken to be 602 of FIG. 6, shifting the converted images 1001 and 1002 so that the position of the subject 405 agrees with each other and then adding them to the captured image 702. In the combined image 1802, the subject 405 is in focus and the subjects 404 and 406 are blurred in the same degree, respectively.

A combined image 1803 is an image generated by, with the focus plane taken to be 603 of FIG. 6, shifting the converted images 1001 and 1002 so that the position of the subject 406 agrees with each other and then adding them to the captured image 702. In the combined image 1803, the subject 406 is in focus and the subjects 404 and 405 are blurred. When the subject 404 and the subject 405 are compared, the subject 404 is more blurred.

By moving the focus plane in this manner, it is possible to obtain a combined image in which a desired subject is brought into focus.

In the case where such combined images as shown in FIG. 18 are generated, the resolution of the converted images 1001 and 1002 at the focus plane is low compared to that of the captured image 702. Because of this, if these images are simply combined without any processing on the image data, the resolution at the focus plane will deteriorate. Consequently, in the present embodiment, only the pixel value of the captured image 702 is used as to the focus plane and the mask image as shown in FIG. 15 is multiplied before combination.

Figure 19A:
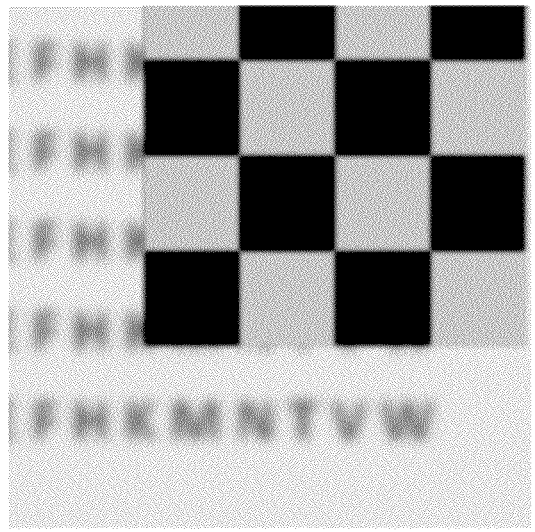
FIG. 19A is an example of a combined image obtained by performing image processing according to the present embodiment on multi-viewpoint image data captured by a camera array with different focal lengths and FIG. 19B is an example of a combined image obtained by applying a prior art to multi-viewpoint image data captured by a camera array with the same focal point.
Figure 19B:
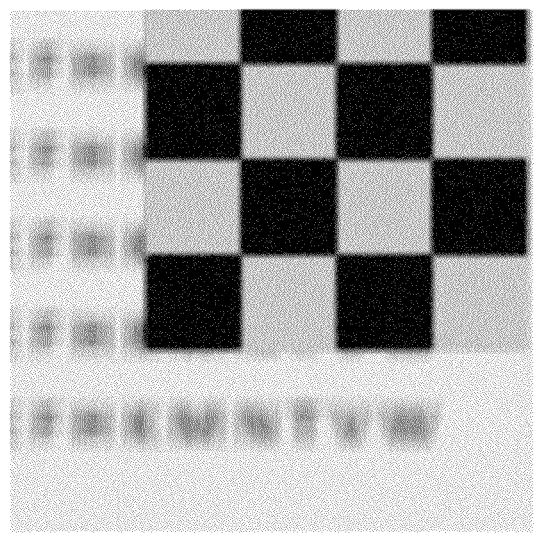

FIG. 19A shows a combined image in the case where the image processing according to the present embodiment is performed on the multi-viewpoint image data captured by a camera array with different focal points including single cameras with different focal lengths. On the other hand, FIG. 19B shows a combined image in the case where the conventional image processing is performed using only the multi-viewpoint image data captured by the single camera with a certain focal length of the camera array with different focal lengths. Both the combined images are in a state where a square in the checkered pattern is placed in front of the background of written alphabets and the front of the square is brought into focus, but, it is known that the blurred part is smoother, noise is more reduced, and the image quality is higher in the combined image in FIG. 19A to which the present embodiment is applied.

Note that, in the present embodiment, the multi-viewpoint image data is obtained at one time by capturing images by a camera array image capturing device (also referred to simply as a "camera array", as known as camera array system, multiple lens camera, and the like" adopting a camera array with different focal points. However, for example, it may also be possible to obtain multi-viewpoint image data by performing image capturing a plurality of times while shifting the viewpoint and changing the focal length using only one image capturing device having a single lens system image capturing unit configured to capture one image by one-time image capturing. In such a case, by allocating a number to the image capturing device at each image capturing time and managing captured image data, it is possible to handle the captured image data in the same manner as that in the case where images are captured by the camera array image capturing device adopting a camera array with different focal lengths.

As above, according to the invention of the present embodiment, it is possible to perform refocus of high image quality in multi-viewpoint image data captured with different focal lengths.

[Second Embodiment]

In the first embodiment, the aspect is explained, in which image combination is performed using only the image data captured by the single cameras with a focal length equal to or less than the output focal length. Next, an aspect is explained as a second embodiment, in which image combination is performed using image data captured by all the single cameras regardless of the length of the output focal length. Explanation of parts common to those of the first embodiment is simplified or omitted and here, different points are explained mainly.

In the present embodiment, in the use image manipulation processing at step 505 of the flowchart of FIG. 5, regardless of the output focal length that is set, resolution conversion in accordance with necessity is performed on image data captured by all the single cameras configuring the camera array with different focal lengths.

Figure 20:
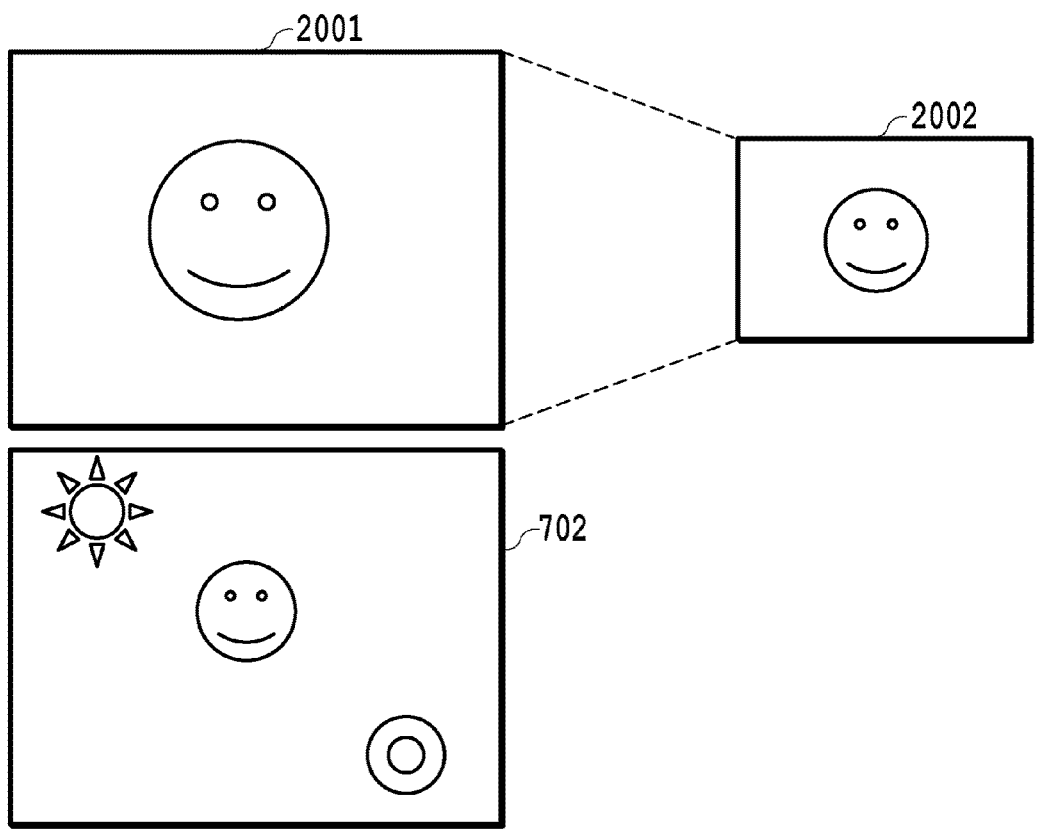
FIG. 20 is a diagram for explaining the way of resolution conversion in a second embodiment.

FIG. 20 is a diagram for explaining the way of resolution conversion in the present embodiment.

A captured image 2001 shows an image captured by a single camera (the focal length is $f_3$: 100 mm or $f_4$: 160 mm) having a focal length greater than that of the single camera 402. It is assumed that the output focal length $f_{out}$ is set to $f_2$: 60 mm, which is the focal length of the single camera 402. In this case, the use image manipulating unit 303 converts the resolution of the captured image 2001 into a resolution equivalent to $f_2$: 60 mm, which is the focal length of the single camera 402, and generates a converted image 2002. Here, as the method of resolution conversion, reduction is applied using interpolation processing by, for example, the bilinear method or the bi-cubic method. As to the captured image with the focal length $f_1$: 30 mm, which is shorter than the focal length $f_2$ of the single camera 402, the same resolution conversion processing (enlargement) as that of the first embodiment is performed.

Figure 21:
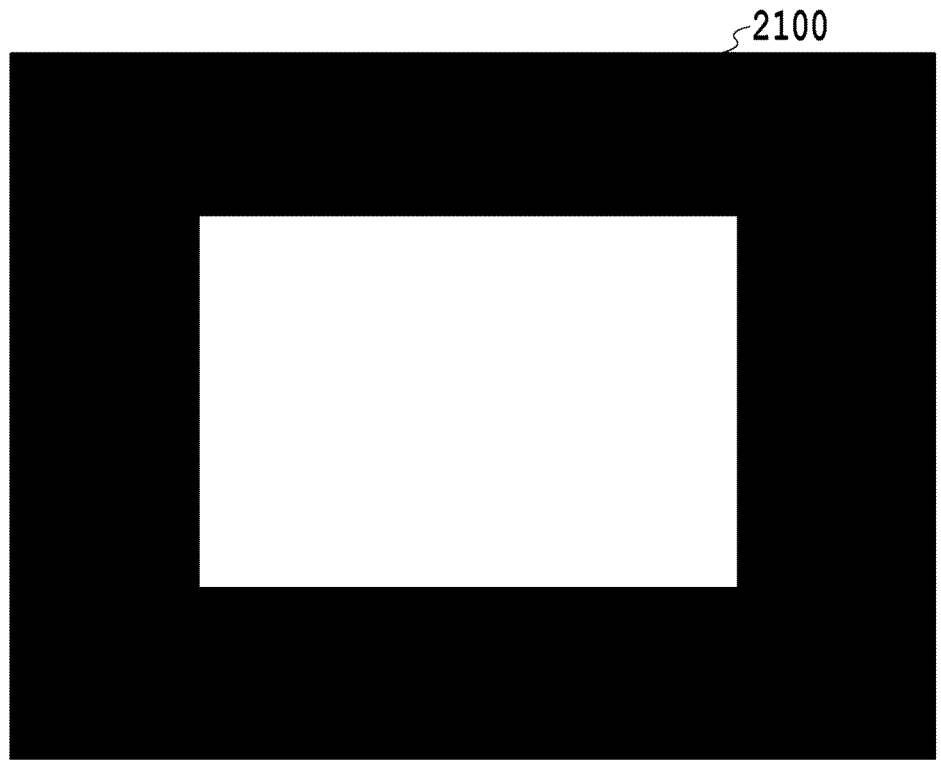
FIG. 21 is a diagram showing an example of a mask image in the second embodiment.

Further, in the present embodiment, in the mask image generation processing at step 1404 of the flowchart of FIG. 14, a mask image 2100 as shown in FIG. 21 is generated and image combination processing is performed. That is, in the case where $f_i > f_{out}$, the mask image generating unit 1302 generates a mask image so that $mask_{mi}(x, y) = 1$ as to pixels (x, y) within the angle of view covered by the $m_i$-th single camera after resolution conversion and then, as to the other pixels (x, y), generates a mask image so that $mask_{mi}(x, y) = 0$. The pixel value of the black part of the mask image 2100 shown in FIG. 21 is zero and the pixel value of the white part is one. Then, the size of the region where the pixel value is one (white rectangular region) is the same as that of the converted image 2002. It is possible to derive the position of the region where the pixel value is one in the mask image 2100 by the same method as that for deriving the trimming region in the first embodiment. For example, by performing processing after replacing the range of angle of view 1203 with the captured image 702 and the range of angle of view 1202 with the converted image 2001 in FIG. 12 described above, it is possible to obtain the pixel position at the left end and the right end in the above-described rectangular region. Generation of a mask image in the case where the focal length $f_i$ of the single camera is equal to or less than the output focal length $f_{out}$ is the same as in the first embodiment.

Performing image combination using all the image data with different focal lengths in this manner makes it possible to obtain a higher image quality than the technique of the first embodiment, for a subject captured by a single (telephoto) lens camera with a focal length greater than the output focal length.

[Third Embodiment]

Next, an aspect is explained as a third embodiment, in which a filter is applied to each image to further reduce a blur. Explanation of parts common to those of the first and second embodiments is simplified or omitted and here, different points are explained mainly.

Figure 22:
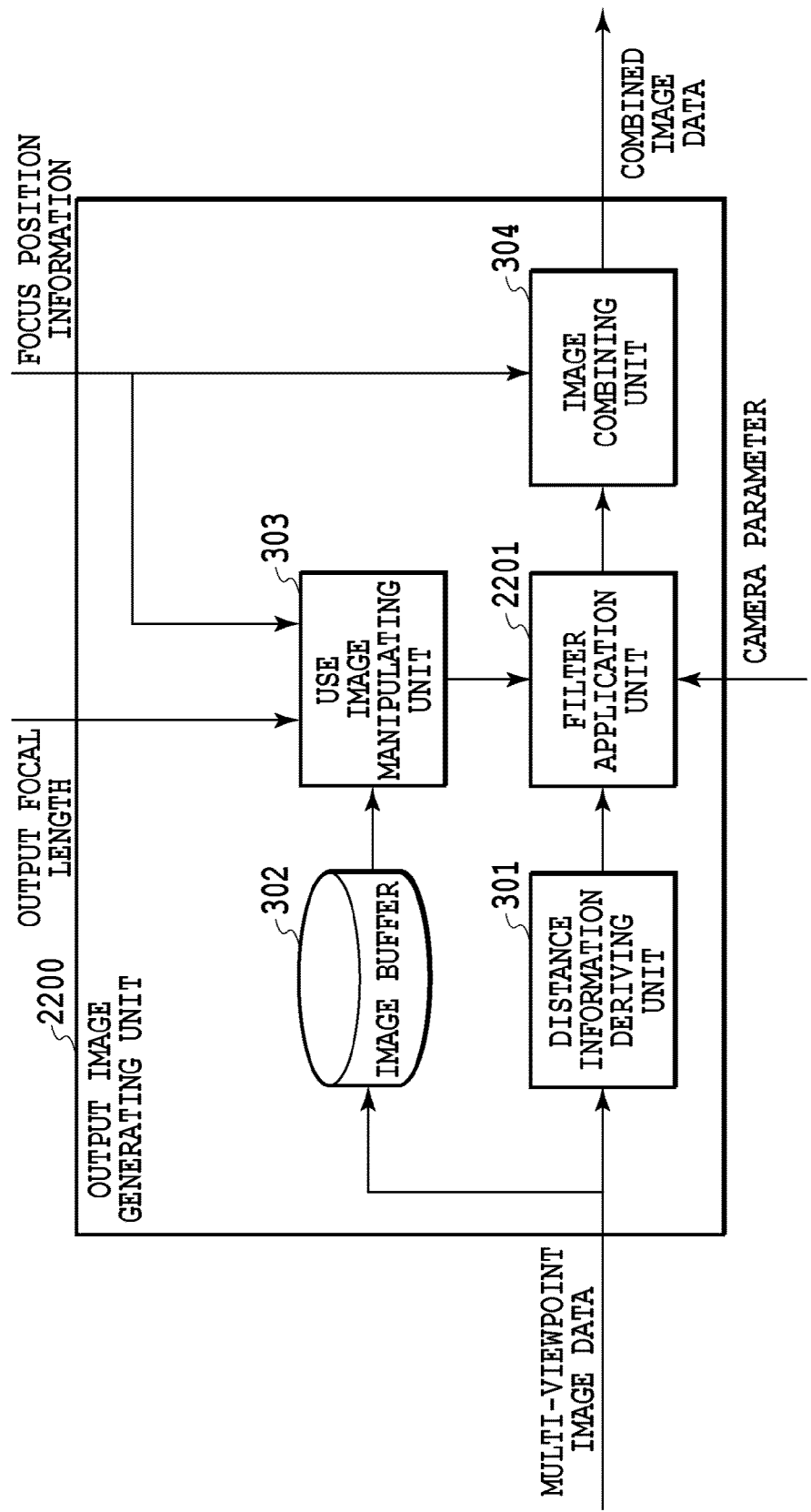
FIG. 22 is a diagram showing an example of an internal configuration of an output image generating unit according to a third embodiment.

FIG. 22 is a diagram showing an example of an internal configuration of an output image generating unit 2200 according to the present embodiment. In comparison with the output image generating unit 105 according to the first embodiment (see FIG. 3), it is known that a filter applying unit 2201 is added to the output image generating unit 2200 according to the present embodiment.

(Filter Applying Unit)

Figure 23:
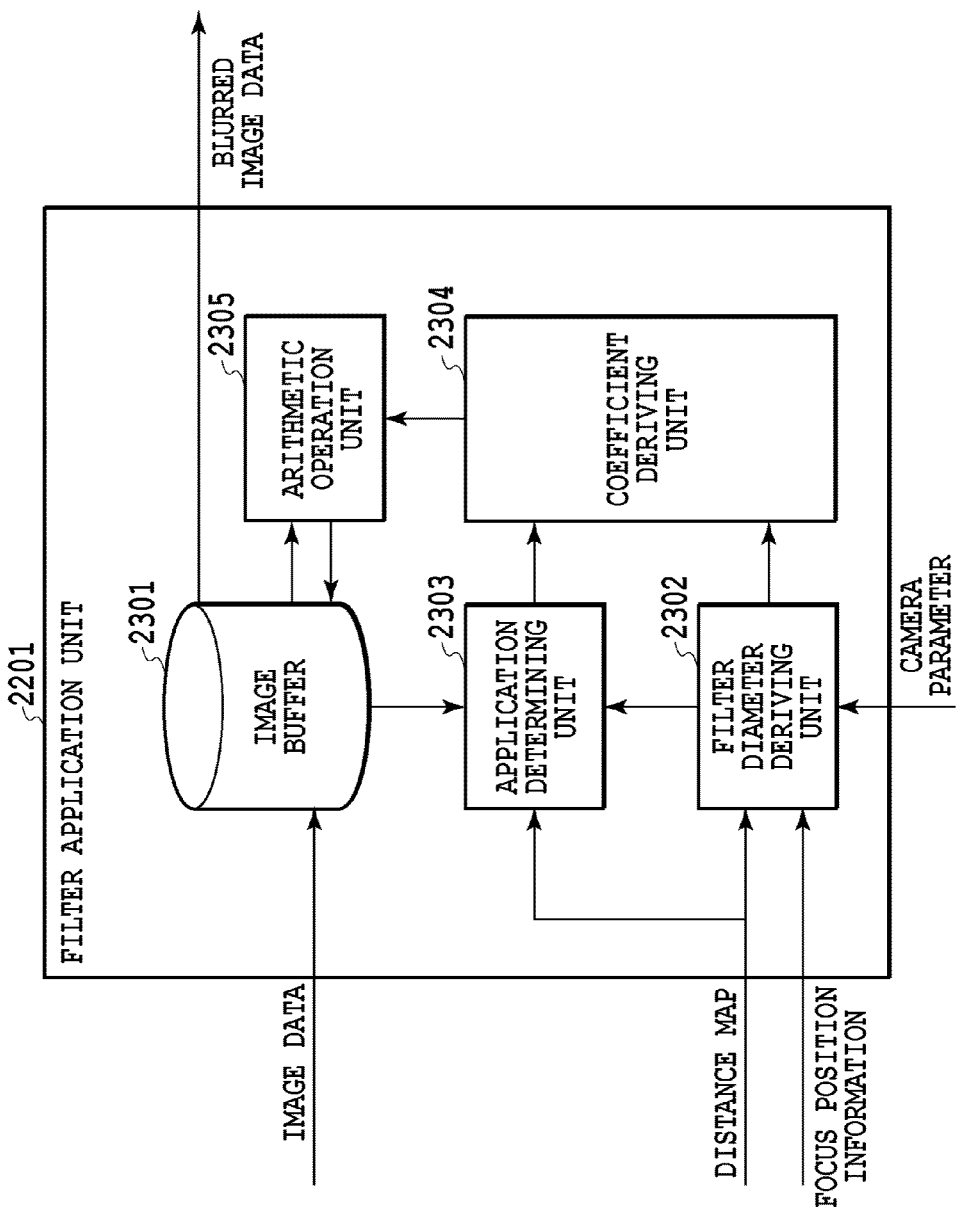
FIG. 23 is a diagram showing an example of an internal configuration of a filter applying unit.

FIG. 23 is a diagram showing an example of an internal configuration of the filter applying unit 2201.

The filter applying unit 2201 includes an image buffer 2301, a filter diameter deriving unit 2302, an application determining unit 2303, a coefficient deriving unit 2304, and an arithmetic operation unit 2305. Hereinafter, each unit is explained.

The image buffer 2301 stores image data of a single camera read by the use image manipulating unit 303 and input through an image data input terminal, not shown schematically.

The filter diameter deriving unit 2302 derives the number of taps of the filter of the pixel of interest and the number of taps of the filter of the peripheral pixel using a distance map viewed from a single camera of interest, focus position information, and parameter information indicative of the characteristics of the image capturing unit 101. The distance map, focus position information, and parameters relating to the image capturing unit 101 are input respectively from a distance map input terminal, focus position input terminal, and parameter input terminal, not shown schematically.

The application determining unit 2303 determines whether or not to apply a filter, specifically, whether or not to multiply the value of the peripheral pixel by a coefficient and add it to the value of the pixel of interest by comparing the relationship between the distances of the pixel of interest and the peripheral pixel of interest.

The coefficient deriving unit 2304 derives a coefficient indicating the influence of the peripheral pixel exerted on the pixel of interest.

The arithmetic operation unit 2305 multiplies the pixel value of the peripheral pixel by the coefficient derived by the coefficient deriving unit 2304 and adds it to the value of the pixel of interest in the image data read from the image buffer 2301. The image data processed by the arithmetic operation unit 2305 (blurred image data) is sent to the image combining unit 304 via a blurred image data output terminal, not shown schematically.

Figure 24:
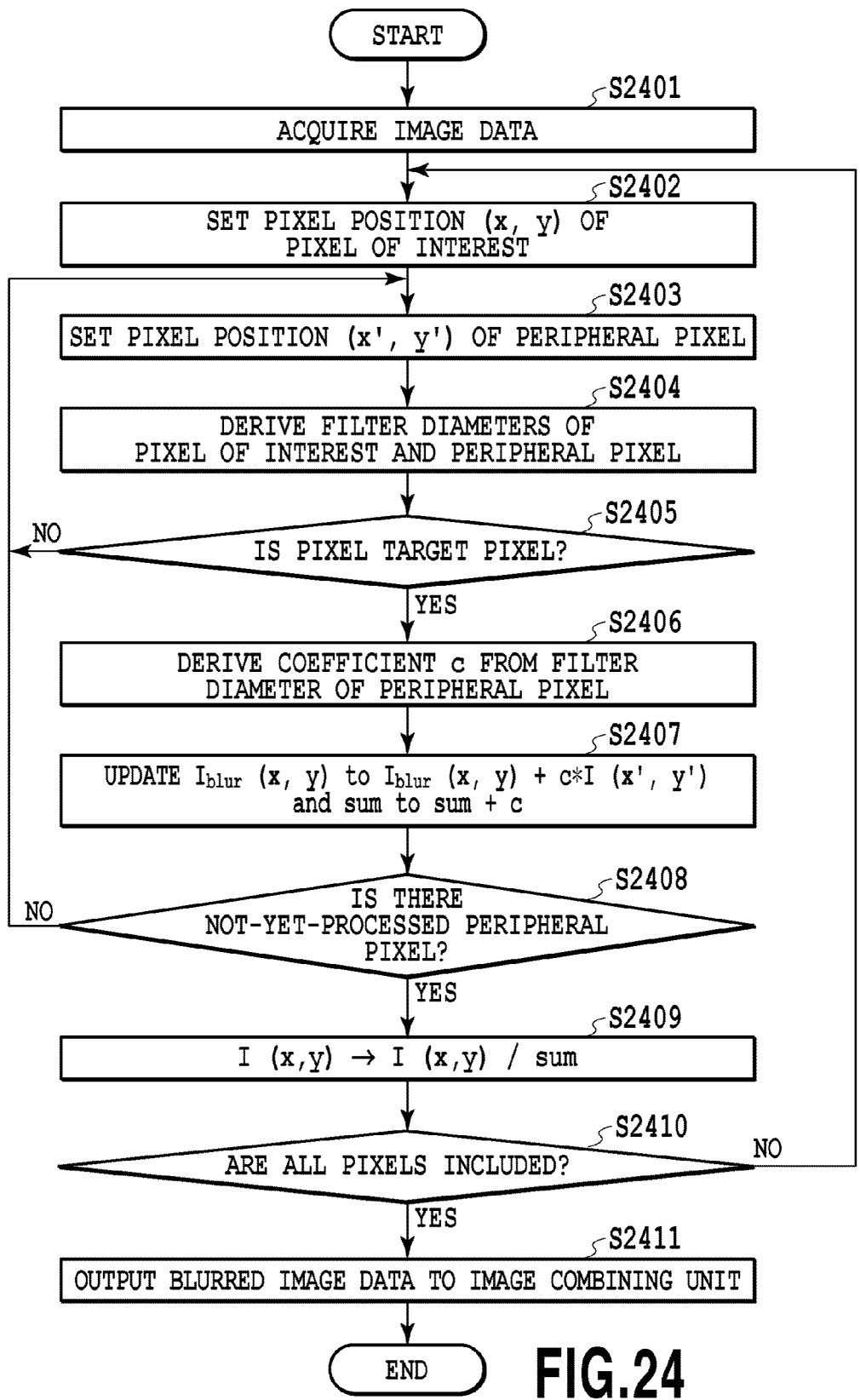
FIG. 24 is a flowchart showing a flow of processing in the filter applying unit.

FIG. 24 is a flowchart showing a flow of processing in the filter applying unit 2201.

At step 2401, the filter applying unit 2201 acquires image data of a single camera of interest.

At step 2402, the filter applying unit 2201 sets a pixel position (x, y) of a pixel of interest. It is assumed that in the stage of start of processing, an initial value is set (here, the position of the uppermost leftmost pixel in the image) and after this, the pixel position is updated sequentially from the upper left toward the bottom right. In the stage of start of processing, the initial value is set as described above and at the same time, the pixel values of all the pixels of blurred image data $I_{blur}$ within the image buffer 2301 are set to zero.

At step 2403, the filter applying unit 2201 sets a pixel position (x', y') of a pixel (peripheral pixel) located on the periphery of the pixel of interest. If the maximum value of the size of the filer to be applied is taken to be (2S+1)×(2S+1), it is assumed that the pixel position (x', y') of the peripheral pixel is updated in the following order.

(x−S, y−S), (x−S+1, y−S), . . . , (x+S, y−S), (x−S, y−S+1), . . . , (x+S, y+S)

Consequently, in the stage of start of processing, as an initial value, (x−S, y−S) is set and at this time, a sum of coefficient sum is set to zero. It may also be possible to determine the maximum value of the filter size in advance or to determine it based on the number of taps of the filter of the subject farthest from the focus position. In this manner, the pixel position of the peripheral pixel is updated from the upper left toward the bottom right of a square having a size of (2S+1)×(2S+1) with the pixel position (x, y) of the pixel of interest as a center. However, it is assumed that in the case where the peripheral pixel position is outside the image, the pixel is clipped so that the pixel position is within the image.

At step 2404, the filter diameter deriving unit 2302 derives the filter diameters of the pixel of interest and the peripheral pixel. Specifically, the filter diameter deriving unit 2302 derives a number of taps σ (x, y) of the filter of the pixel of interest that is set and a number of taps σ (x", y') of the filter of the peripheral pixel that is set. Here, it is assumed that as the number of taps of the filter, an amount in proportion to the amount of parallax of the single camera is adopted. If a distance of a subject the image of which is formed at the pixel of interest is taken to be d (x, y), the distance corresponding to the focus position to be $d_{focus}$, the interval between single cameras to be L, a pixel pitch to be Δ, and A to be an appropriate constant of proportion, it is known from FIG. 17 that it is sufficient to determine σ(x, y) so as to satisfy Formula (8) below.

[Expression 6]

$$\sigma(x, y) = A \frac{f_{out} L}{\Delta} \left| \frac{1}{d(x, y)} - \frac{1}{d_{focus}} \right| \qquad \text{Formula (8)}$$

At step 2405, the application determining unit 2303 determines whether the pixel is a pixel to which the filter is to be applied. Specifically, a depth of the subject the image of which is formed at the peripheral pixel is taken to be d (x', y') and whether the pixel is a target pixel is determined using Formula (9) and Formula (10) below.

[Expression 7]

$$d(x',y) < d < (x,y) \qquad \text{Formula (9)}$$

[Expression 8]

$$\sqrt{(x'-x)^2 + (y'-y)^2} \leq \sigma(x,y) \qquad \text{Formula (10)}$$

In this case, Formula (9) is the condition to determine presence/absence of occlusion of the pixel of interest and Formula (10) is the condition provided to generate a clear pre-blur. In the case where either of Formula (9) and Formula (10) is "true", the pixel is determined to be the target pixel and the procedure proceeds to step 2406. On the other hand, in the case where both are "false", the pixel is determined to be not the target pixel, and the procedure returns to step 2403 and the pixel position (x', y') of the next peripheral pixel is set. If it is possible to reduce the final blur by taking the influence of occlusion into consideration, the formulas to determine whether the pixel is a pixel to which the filter is to be applied are not limited to Formula (9) and Formula (10) described above.

At step 2406, the coefficient deriving unit 2304 derives a coefficient c from the number of taps σ (x', y') of the peripheral pixel. Here, it is assumed that the coefficient c is a Gaussian coefficient and derived using Formula (11) below.

[Expression 9]

$$c = \frac{1}{2\pi\sigma(x', y')^2} \exp\left(-\frac{[(x-x')^2 + (y-y')^2]}{2\sigma(x', y')^2}\right) \qquad \text{Formula (11)}$$

The coefficient c is not limited to a Gaussian coefficient as long as it is a coefficient to reduce a blur.

At step 2407, the arithmetic operation unit 2305 updates $I_{blur}$ of the pixel of interest and the sum of coefficient sum in accordance with Formula (12) and Formula (13) below.

[Expression 10]

$$I_{blur}(x,y) \rightarrow I_{blur}(x,y) + cI(x',y') \qquad \text{Formula (12)}$$

[Expression 11]

$$\text{sum} \rightarrow \text{sum} + c \qquad \text{Formula (13)}$$

At step 2408, the filter applying unit 2201 determines whether the processing of all the peripheral pixels (2S+1)×(2S+1) of the pixel of interest is completed. In the case where the processing of all the peripheral pixels (2S+1)×(2S+1) of the pixel of interest is completed as a result of the determination, the procedure proceeds to step 2409. On the other hand, in the case where there is a not-yet-processed peripheral pixel, the procedure returns to step 2403 and the pixel position (x', y') of the next peripheral pixel is set.

At step 2409, the arithmetic operation unit 2305 divides I (x, y) by sum.

At step 2410, the filter applying unit 2201 determines whether the pixel positions (x, y) of the pixel of interest include the positions of all the pixels within the acquired image data. In the case where the positions of all the pixels are included as a result of the determination, the procedure proceeds to step 2411. On the other hand, in the case where there is a not-yet-processed pixel, the procedure returns to step 2402 and the pixel position (x, y) of the next pixel of interest is set.

At step 2411, the filter applying unit 2201 outputs blurred image data to the image combining unit 304 through a blurred image data output terminal, not shown schematically.

The above is the processing in the filter applying unit 2201.

According to the present embodiment, it is made possible to generate an image in which a blur is reduced by applying the filter to each image before combining images.

[Fourth Embodiment]

Next, an aspect is explained as a fourth embodiment, in which the precision of distance estimation to a subject is improved using information of single cameras with different focal lengths. Explanation of parts common to those of the first to third embodiments is simplified or omitted and here, different points are explained mainly.

Here, it is assumed that distance information is obtained by selecting one image that serves as a reference (hereinafter, referred to as a "reference image") from among a group of images included in multi-viewpoint image data and by obtaining a parallax (parallax vector) relative to the selected reference image. It is also assumed that a number associated with each viewpoint (each single camera), such as 1, 2, 3, . . . , and M, is attached to each image included in the multi-viewpoint image data and it is made possible to identify which image is captured from which viewpoint (by which single camera).

Figure 25:
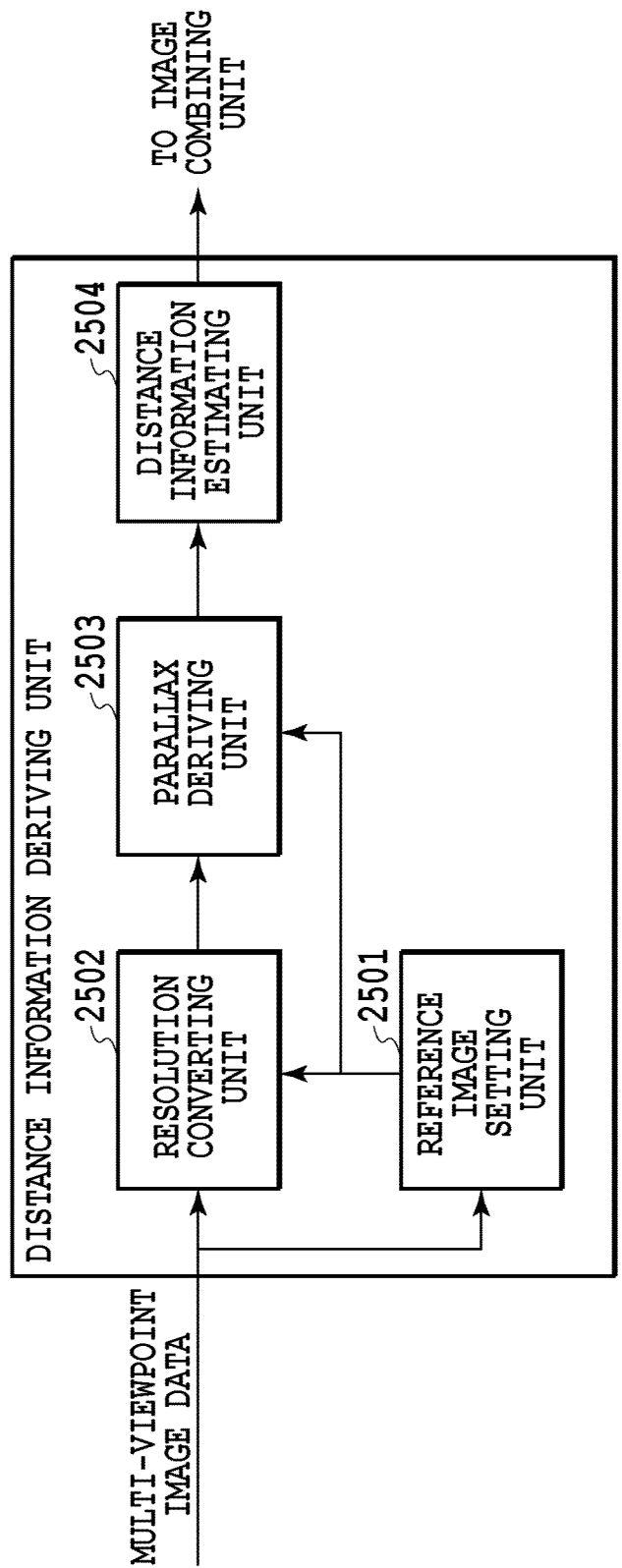
FIG. 25 is a diagram showing components of an image processing device in a fourth embodiment.

FIG. 25 is a diagram showing an internal configuration of the distance information deriving unit 301 according to the present embodiment. In the case of the present embodiment, the multi-viewpoint image data input to the distance information deriving unit 301 is sent to a reference image setting unit 2501 and a resolution converting unit 2502.

The reference image setting unit 2501 selects one image that serves as a reference (for example, an image with the widest angle of the group of images or an image captured by the single camera arranged at the center of the camera array) from among the group of images included in the multi-viewpoint image data. Then, the reference image setting unit 2501 sends a focal length $f_{focus}$ at the time of image capturing of the selected reference image to the resolution converting unit 2502 and a parallax deriving unit 2503.

The resolution converting unit 2502 performs processing to convert the resolution of the image captured by the single camera with the focal length $f_i$ into a resolution $f_{focus}/f_i$ times the original resolution. Details of the resolution conversion processing will be described later.

Figure 26A:
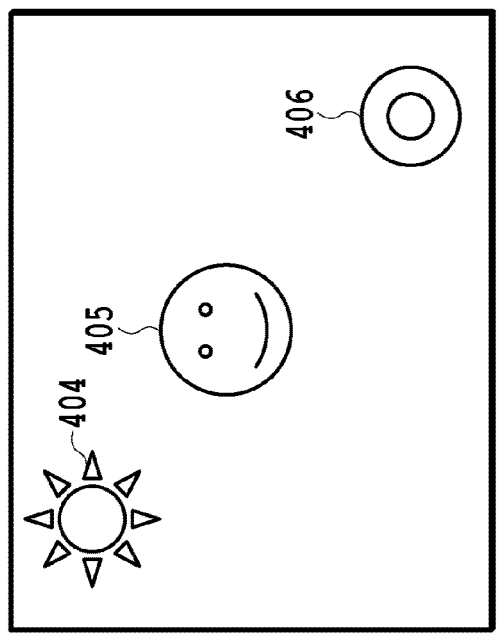
FIGS. 26A to 26C are conceptual diagrams of a parallax vector.
Figure 26B:
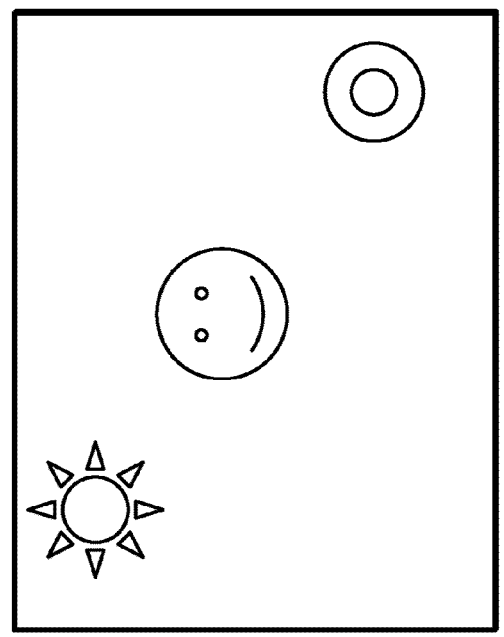
Figure 26C:
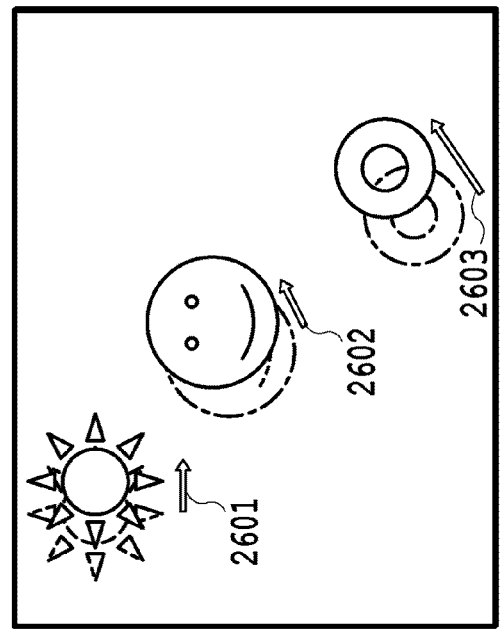

The parallax deriving unit 2503 obtains a parallax vector (u (x, y), v (x, y)) between the image subjected to the resolution conversion processing (hereinafter, referred to as the "resolution-converted image") and the reference image with respect to the pixel position (x, y). To derive a parallax, for example, it is sufficient to apply the publicly-known technique, such as the block matching, the phase-limited correlation method, and the Lucas-Kanade method. FIGS. 26A to 26C are diagrams for explaining the concept of the parallax vector. In FIGS. 26A to 26C, FIG. 26A shows a reference image and FIG. 26B shows a resolution-converted image. Then, FIG. 26C is a diagram showing the state where the reference image shown in FIG. 26A and the resolution-converted image shown in FIG. 26B are overlapped and each of arrows 2601 to 2603 under each of the subjects 404 to 406 represents the parallax vector of each subject. In the present embodiment, it is assumed that the parallax vector is obtained for each pixel, but, it may also be possible to obtain the parallax vector for each specific region in the image or to obtain in relation to the subject of interest.

A distance information estimating unit 2504 estimates the distance to a subject based on the information of the parallax vector derived by the parallax deriving unit 2503. The estimated distance information is output to the image combining unit 304.

Figure 27:
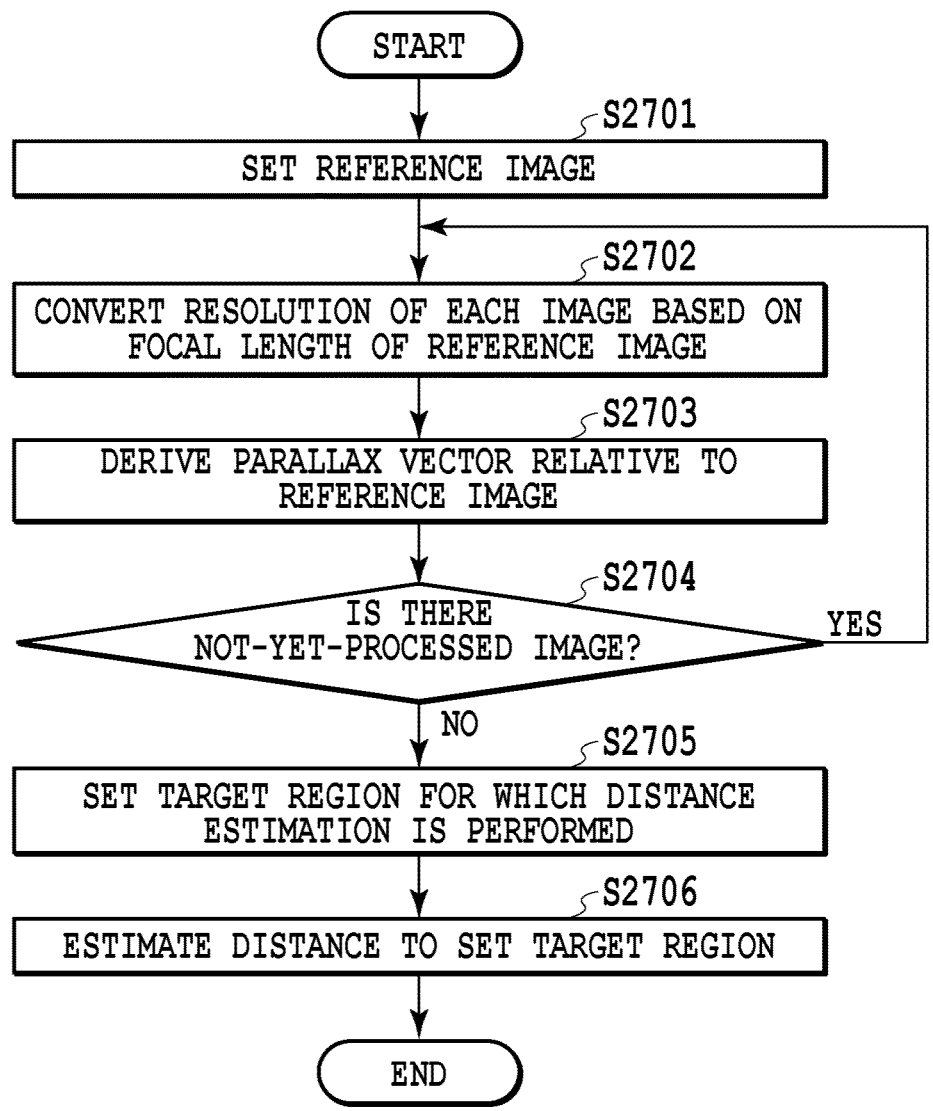
FIG. 27 is a flowchart showing a flow of processing in an image processing unit.

FIG. 27 is a flowchart showing a flow of processing to obtain the distance to a subject from multi-viewpoint image data.

At step 2701, the reference image setting unit 2501 receives multi-viewpoint image data from the A/D conversion unit 102, selects one image that serves as a reference from among the group of images included in the multi-viewpoint image data, and sets the image as a reference image.

At step 2702, the resolution converting unit 2502 performs resolution conversion processing for each image configuring the multi-viewpoint image data based on the focal length $f_{focus}$ of the image set as the reference image. Specifically, as to the i-th image (i is a natural number of 1 to M), which is the target of processing of each of the images configuring the multi-viewpoint image data, in the case where the focal length $f_i$ of the image is greater than the focal length $f_{focus}$ of the reference image ($f_i > f_{focus}$), the resolution converting unit 2502 performs resolution conversion to reduce the image (see FIG. 20). Similarly, in the case where the focal length $f_i$ of the image is smaller than the focal length $f_{focus}$ of the reference image($f_i < f_{focus}$), the resolution converting unit 2502 performs resolution conversion to enlarge the image (see FIG. 10). As the method of resolution conversion, as in the first embodiment, the interpolation processing by the bilinear method or the bi-cubic method is applied, but, different from the first embodiment, in the present embodiment, trimming is not performed. If $f_i = f_{focus}$, resolution conversion is not performed.

At step 2703, the parallax deriving unit 2503 obtains the parallax vector of the i-th image, which is the target of processing, by a method, such as block matching.

At step 2704, whether there is a not-yet-processed image is determined (whether i<M is determined). When i<M, i is updated to i+1, and the procedure returns to step 2702 and the processing at step 2702 and step 2703 is performed for the next image. On the other hand, when i≥M, the procedure proceeds to step 2705.

At step 2705, the distance information estimating unit 2504 sets a region for which distance estimation is performed (target region). It may also be possible for a user to specify the target region via an UI, not shown schematically, or to detect a feature point in the image by, for example, the face recognition technique etc. and to set a region including the detected feature point as the target region. Further, it may also be possible to perform distance estimation for all the pixels as the targets, not only for the specific region in the image.

At step 2706, the distance information estimating unit 2504 estimates the distance to the set target region. Specifically, as follows.

Figure 28:
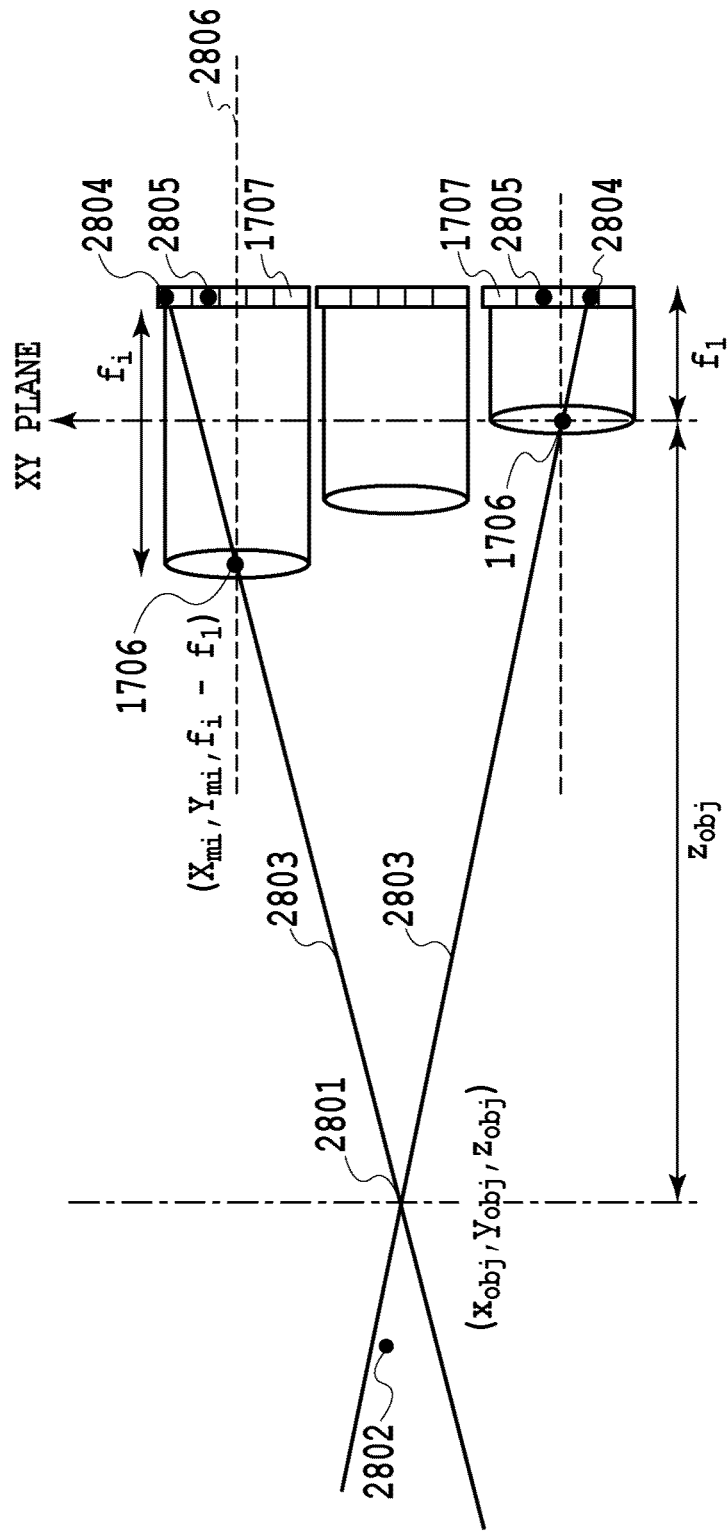
FIG. 28 is a diagram for explaining the way of distance estimation in the fourth embodiment.

FIG. 28 is a diagram for explaining distance estimation using information of the single cameras with different focal lengths. In FIG. 28, a point 2801 indicates the position of a subject, which is the target region for which distance estimation has been performed, and a point 2802 indicates the actual position of the subject. A line segment 2803 is a line that connects the point 2801 and the main point 1706 of the lens of each single camera and a point 2804 is an intersection of the line segment 2803 and the sensor 1707. Then, a point 2805 indicates the position of the image of the subject on the sensor 1707. In this case, if the point 2801 and the point 2802 agree with each other, the point 2804 and the point 2805 agree with each other as a result. Consequently, coordinates ($x_{obj}$, $y_{obj}$, $z_{obj}$) of the point 2801 indicating the position of the subject are estimated so that the difference between the point 2804 and the point 2805 becomes as small as possible.

First, the coordinates of the point 2804 can be represented by Formula (14) below.

[Expression 12]

$$-\frac{f_i}{z_{obj} - (f_i - f)_1}(x_{obj} - X_{mi}) \qquad \text{Formula (14)}$$

Here, $x_{obj}$ and $X_{mi}$ represented by boldface type represent two-dimensional vectors of (x, y), and ($X_{mi}$, $Y_{mi}$) represents the coordinates of the main point 1706. The subscript mi of $X_{mi}$ represents the number of the single camera with the focal length $f_i$ and ($x_{obj}$, $y_{obj}$, $z_{obj}$) represents the coordinates of the subject for which estimation is performed. Normally, $z_{obj}$ is sufficiently larger than $f_i$, and therefore, here, $f_i-f_1$ is ignored in Formula (14) described above. Then, if relative coordinates of the point 2805 relative to an optical axis 2806 are taken to be $(s_{xmi}, s_{ymi})$, in order that the difference between the point 2804 and the point 2805 will become small in each single camera, for example, it is sufficient to reduce a value represented by Formula (15) below.

[Expression 13]

$$V = \sum_i \sum_{m_i} |-f_i(X_{obj} - Z_{obj}X_{m_i}) - s_{m_i}|^2 \quad \text{Formula (15)}$$

In Formula (15) described above, i is the index indicating the i-th focal length and $m_i$ is the index of the single camera having the i-th focal length $f_i$. It is assumed that the sum as to i and $m_i$ is calculated for the single cameras facing the same subject.

When the subject for which distance estimation is performed is determined in the reference image, it is possible to obtain the relative coordinates $(s_{xmi}, s_{ymi})$ in the reference image. In order to do so, it is sufficient to multiply the pixel position in the case where the center of the reference image is taken to be the origin by the pixel pitch of the sensor 1707. Relative coordinate $(s_{xmi}', s_{ymi}')$ in an image captured by another single camera can be obtained by multiplying the parallax vector $(u(x,y), v(x,y))$ obtained at step 2703 by the ratio $f_i/f_{focus}$ of the focal length to that of the reference image and the pixel pitch $\Delta$ of the sensor 1707 and by adding the position vector of the subject in the reference image. That is, the relative coordinates $(s_{xmi}', s_{ymi}')$ are obtained by Formula (16) below.

[Expression 14]

$$s'_{m_i} = u(x,y) \frac{f_i}{f_{focus}} \Delta + s_{m_i} \quad \text{Formula (16)}$$

Here, if replacements are performed as $Z_{obj} \equiv 1/z_{obj}$, $X_{obj} \equiv Z_{obj} x_{obj}$, $Y_{obj} \equiv Z_{obj} y_{obj}$, Formula (17) below is obtained.

[Expression 15]

$$V = \sum_i \sum_{m_i} |f_i(X_{obj} - Z_{obj}X_{m_i}) + s_{m_i}|^2 \quad \text{Formula (17)}$$

Then, by performing partial differentiation of Formula (17) described above with respect to $Z_{obj}$ and the partial derivative is caused to be equal to zero, Formula (18) below is obtained.

[Expression 16]

$$\frac{\partial V}{\partial Z_{obj}} = 2 \sum_i f_i \sum_{m_i} [f_i(X_{obj} - Z_{obj}X_{m_i}) + s_{m_i}] \cdot X_{m_i} \quad \text{Formula (18)}$$
$$= 0$$

Here, if the origin of the coordinate system is selected so as to satisfy the relationship of Formula (19) below, Formula (18) described above can be simplified as Formula (20) below.

[Expression 17]

$$\sum_i f_i^2 \sum_{m_i} X_{m_i} = 0 \quad \text{Formula (19)}$$

[Expression 18]

$$Z_{obj} = \frac{\sum_i f_i \sum_{m_i} s_{m_i} \cdot X_{m_i}}{\sum_i f_i^2 \sum_{m_i} X_{m_i}^2} \quad \text{Formula (20)}$$

Here, $Z_{obj}=1/z_{obj}$, and therefore, the distance to the subject is represented by Formula (21).

[Expression 19]

$$z_{obj} = -\frac{\sum_i f_i^2 \sum_{m_i} X_{m_j}^2}{\sum_i f_i \sum_{m_i} s_{m_i} \cdot X_{m_i}} \quad \text{Formula (21)}$$

Consequently, if the coordinates of the main point 1706 of the single camera and the position (point 2805) of the image of the subject are known, it is possible to estimate the distance to the subject from Formula (21) described above.

Here, it is explained that the precision of distance estimation is more improved in the case where information of single cameras with different focal lengths is used than in the case where only information of single cameras with the same focal length is used.

By differentiating Formula (20) described above with respect to the relative coordinates $(s_{xmi}, s_{xmi})$, Formula (22) below is obtained.

[Expression 20]

$$\frac{\partial z_{obj}}{\partial s_{m_i}} = -\frac{z_{obj}^2 f_i X_{m_i}}{\sum_i f_i^2 \sum_{m_i} X_{m_i}^2} \quad \text{Formula (22)}$$

In this case, if it is assumed that errors of parallax vectors are independent from each other and all errors of each of the parallax vectors are $\delta s$, a distance estimation error $\delta z_{obj}$ is represented by Formula (23) below.

[Expression 21]

$$\delta z_{obj} = \sqrt{\sum_i \sum_{m_i} \left(\frac{\partial z_{obj}}{\partial s_{m_i}}\right)^2 \delta s^2} \quad \text{Formula (23)}$$
$$= \frac{z_{obj}^2 \delta s}{\sqrt{\sum_i f_i^2 \sum_{m_i} X_{m_i}^2}}$$

As is obvious from Formula (23) described above, it is known that the distance estimation precision is improved because as the more information of single cameras with different focal lengths is used, the value of denominator on the right side becomes larger, and therefore, the distance estimation error $\delta z_{obj}$ becomes smaller.

The distance to the subject is estimated in the manner described above. Then, data of the distance information to the subject obtained by estimation is sent to the image combining unit 304 and utilized in the image combination processing.

According to the present embodiment, by using image data with different focal lengths, it is made possible to estimate the distance to the subject with higher precision than in the case where distance estimation is performed using only single cameras with the same focal length.

The present embodiment is explained as a modification example of the distance information deriving unit 301, which is one of components of the output image generating unit 105 explained in the first embodiment, but, it may also be possible to configure the present embodiment as an independent distance information deriving device. It can be thought that the distance information to the subject obtained by such an independent distance information deriving device is used for purposes other than image combination processing, such as gesture recognition, three-dimensional measurement, and unwanted subject removal.

[Fifth Embodiment]

As a further aspect, it may also be possible to perform distance estimation using image data captured by a single camera having a first focal length and to perform combination processing of image data captured by another single camera having a second focal length different from the first focal length by utilizing the obtained distance information.

In this case, it is desirable for the first focal length to be smaller than the second focal length (that is, the angle of view of the image used in distance estimation is greater than the angle of view of the image used in image combination), but, this is not limited in particular. The specific methods of distance estimation and image combination are the same as those explained in the other embodiments.

(Other Embodiments)

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-041147, filed Feb. 28, 2012, and 2012-244399, filed Nov. 6, 2012, which are hereby incorporated by reference herein in their entirety.

What is claimed is:

1. An image processing device for generating combined image data using multi-viewpoint image data including image data acquired with different focal lengths, the image processing device comprising:

a resolution converting unit configured to perform resolution conversion for at least part of image data in multi-viewpoint image data in accordance with a focal length to be output; and an image combining unit configured to generate combined image data with the focal length to be output using the resolution-converted image data, wherein at least part of image data is image data acquired with a focal length shorter than the focal length to be output, and wherein the resolution converting unit performs resolution conversion accompanied by enlargement for the image data acquired with the shorter focal length.

2. An image processing device for generating combined image data using multi-viewpoint image data including image data acquired with different focal lengths, the image processing device comprising:

a resolution converting unit configured to perform resolution conversion for at least part of image data in multi-viewpoint image data in accordance with a focal length to be output; and an image combining unit configured to generate combined image data with the focal length to be output using the resolution-converted image data, wherein at least part of image data is image data acquired with a focal length greater than the focal length to be output, and wherein the resolution converting unit performs resolution conversion accompanied by reduction for the image data acquired with the greater focal length.

3. The image processing device according to claim 1, wherein the image combining unit generates the combined image data by applying a filter to the multi-viewpoint image data to weight and add the multi-viewpoint image data based on information of a focus position to be output.

4. The image processing device according to claim 1, wherein the multi- viewpoint image data is image data acquired by an image capturing device having two or more kinds of focal lengths and capable of simultaneously capturing a plurality of images from different viewpoints.

5. The image processing device according to claim 4, wherein the image capturing device capable of simultaneously capturing a plurality of images from different viewpoints is a camera array with different focal points or a plenoptic camera with different focal points.

6. An image processing method for generating combined image data using multi-viewpoint image data including image data captured with different focal lengths, the image processing method comprising the steps of:

performing resolution conversion for at least part of image data in the multi-viewpoint image data in accordance with a focal length to be output; and generating combined image data with the focal length to be output using the resolution- converted image data, wherein at least part of image data is image data acquired with a focal length shorter than the focal length to be output, and wherein, in the resolution converting step, resolution conversion is accompanied by performing enlargement for the image data acquired with the shorter focal length.

7. A program stored in a non-transitory computer readable storage medium for causing a computer to perform an image processing method for generating combined image data using multi-viewpoint image data including image data captured with different focal lengths, the image processing method comprising the steps of:

performing resolution conversion for at least part of image data in the multi-viewpoint image data in accordance with a focal length to be output; and generating combined image data with the focal length to be output using the resolution- converted image data, wherein at least part of image data is image data acquired with a focal length greater than the focal length to be output, and wherein, in the resolution converting step, resolution conversion is accompanied by performing reduction for the image data acquired with the greater focal length.

8. An image processing method for generating combined image data using multi-viewpoint image data including image data captured with different focal lengths, the image processing method comprising the steps of:

performing resolution conversion for at least part of image data in multi-viewpoint image data in accordance with a focal length to be output; and generating combined image data with the focal length to be output using the resolution- converted image data, wherein the at least part of image data is image data acquired with a focal length greater than the focal length to be output, and wherein, in the resolution converting step, the resolution conversion is accompanied by performing reduction for the image data acquired with the greater focal length.

* * * * *